US011288782B2

(12) United States Patent
Lee et al.

(10) Patent No.: US 11,288,782 B2
(45) Date of Patent: Mar. 29, 2022

(54) ELECTRONIC DEVICE FOR PERFORMING VIDEO HDR PROCESSING BASED ON IMAGE DATA OBTAINED BY PLURALITY OF IMAGE SENSORS

(71) Applicant: SAMSUNG ELECTRONICS CO., LTD., Suwon-si (KR)

(72) Inventors: Su-Young Lee, Daejeon (KR); Jeongwook Lee, Suwon-si (KR); Daejung Kim, Hwaseong-si (KR); Hwansun Sung, Seongnam-si (KR); Hyunseok Yang, Suwon-si (KR); Eunjik Yi, Seoul (KR); Joohyoung Lee, Seoul (KR); Sooman Jeong, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/899,162

(22) Filed: Jun. 11, 2020

(65) Prior Publication Data
US 2021/0090222 A1 Mar. 25, 2021

(30) Foreign Application Priority Data
Sep. 23, 2019 (KR) .......................... 10-2019-0116781

(51) Int. Cl.
G06T 7/00 (2017.01)
G06T 5/00 (2006.01)
(Continued)

(52) U.S. Cl.
CPC .............. *G06T 5/009* (2013.01); *G06T 3/40* (2013.01); *G06T 7/11* (2017.01); *G06T 2207/10016* (2013.01); *G06T 2207/20132* (2013.01)

(58) Field of Classification Search
CPC ............ H04N 5/2258; H04N 5/23238; H04N 5/2355; H04N 5/23232; H04N 5/265;
(Continued)

(56) References Cited

U.S. PATENT DOCUMENTS 8,189,100 B2  5/2012  Li et al.
9,253,397 B2  2/2016  Lee et al.
(Continued)

FOREIGN PATENT DOCUMENTS

JP    6031670 B2    11/2016
JP    2018-56940 A   4/2018
(Continued)

Primary Examiner — Li Liu
(74) Attorney, Agent, or Firm — Sughrue Mion, PLLC

(57) ABSTRACT

An electronic device performs HDR processing by using a plurality of image sensor blocks including a first image sensor block that photographs an object at a first field of view and a second image sensor block that photographs the object at a second field of view greater than the first field of view. An image signal processor generates first image data and second image data based on the photographed object. A main processor crops image data among image data of the second sensor that correspond to image data of the first sensor, and performs HDR processing based on the first image data and the cropped second image data.

19 Claims, 23 Drawing Sheets

(51) Int. Cl.
*G06T 7/11* (2017.01)
*G06T 3/40* (2006.01)

(58) Field of Classification Search
CPC ... H04N 9/09; G06T 2207/20221; G06T 5/50; G06T 2207/20208
See application file for complete search history.

(56) References Cited

U.S. PATENT DOCUMENTS

| | | | |
|---|---|---|---|
| 9,456,134 B2 | 9/2016 | Venkataraman et al. | |
| 9,876,952 B2 | 1/2018 | Shabtay et al. | |
| 9,892,488 B1* | 2/2018 | Brailovskiy | G06T 7/337 |
| 9,973,672 B2 | 5/2018 | Du et al. | |
| 10,021,313 B1 | 7/2018 | Chen et al. | |
| 10,200,671 B2* | 2/2019 | Dahi | H04N 5/23254 |
| 10,223,775 B2 | 3/2019 | Swami et al. | |
| 10,587,816 B1* | 3/2020 | Douady | H04N 5/23277 |
| 10,863,105 B1* | 12/2020 | Rosengaus | H04N 5/2258 |
| 10,999,527 B1* | 5/2021 | Guerin | H04N 5/23238 |
| 2006/0177150 A1* | 8/2006 | Uyttendaele | G06T 5/009 382/284 |
| 2013/0242057 A1* | 9/2013 | Hong | G06T 5/50 348/47 |
| 2014/0111650 A1* | 4/2014 | Georgiev | H04N 5/2257 348/159 |
| 2017/0094164 A1* | 3/2017 | Shabtay | G06T 11/60 |
| 2017/0374281 A1 | 12/2017 | Kim et al. | |
| 2018/0139367 A1 | 5/2018 | Chen et al. | |
| 2018/0160051 A1* | 6/2018 | Schaefer | H04N 5/265 |
| 2018/0262673 A1 | 9/2018 | Urfalioglu | |
| 2018/0295283 A1 | 10/2018 | Kim | |
| 2019/0059715 A1* | 2/2019 | Lamba | G06T 5/50 |

FOREIGN PATENT DOCUMENTS

| | | |
|---|---|---|
| KR | 10-1670176 B1 | 10/2016 |
| KR | 10-1823256 B1 | 1/2018 |

* cited by examiner

ELECTRONIC DEVICE FOR PERFORMING VIDEO HDR PROCESSING BASED ON IMAGE DATA OBTAINED BY PLURALITY OF IMAGE SENSORS

CROSS-REFERENCE TO RELATED APPLICATIONS

This application claims priority under 35 U.S.C. § 119 to Korean Patent Application No. 10-2019-0116781 filed on Sep. 23, 2019, in the Korean Intellectual Property Office, the disclosure of which in incorporated by reference herein in its entirety.

BACKGROUND

Embodiments of the inventive concept described herein relate to an electronic device, and more particularly to an electronic device for implementing video high dynamic range (HDR) processing based on a plurality of image sensors.

An image photographing device is used to capture a photograph of an image intended by a user to include an object focused on by the user and a background. The image photographing device includes various electronic circuits for collecting light and generating a signal associated with an image, and provides the user with a service of photographing the image depending on operations of the electronic circuits.

The image photographing device is popular and widely being utilized by many users. Accordingly, there is a need to satisfy various requirements of users with regard to the performance and functionality of the image photographing device.

For example, an increase of the processing performance and the operating speed of the image photographing device may be desirable to improve the user experience when operating the image photographing device. For example, methods of operating the image photographing device may need to be appropriately controlled to reduce power consumption of the image photographing device. As such, schemes for improving the structure and operation of the image photographing device are being proposed to satisfy various requirements of users.

SUMMARY

Embodiments of the inventive concept provide an electronic device configured to perform video high dynamic range (HDR) processing based on image data obtained by a plurality of image sensors.

According to an embodiment, there is provided an electronic device including a first image sensor block configured to photograph an object at a first field of view and to generate a first data signal corresponding to the object photographed at the first field of view, a second image sensor block configured to photograph the object at a second field of view greater than the first field of view and to generate a second data signal corresponding to the object photographed at the second field of view, an image signal processor configured to generate first image data of a first resolution based on the first data signal and to generate second image data of a second resolution based on the second data signal, and a main processor configured to obtain cropped image data from among the second image data that correspond to the first image data and to perform high dynamic range (HDR) processing based on the first image data and the cropped image data.

According to an embodiment, there is provided an electronic device including a first image sensor block configured to photograph an object at a first field of view and to generate a first data signal corresponding to the object photographed at the first field of view, a second image sensor block configured to photograph the object at a second field of view greater than the first field of view and to generate a second data signal corresponding to the object photographed at the second field of view, a third image sensor block configured to photograph the object at a third field of view greater than the second field of view and to generate a third data signal corresponding to the object photographed at the third field of view, an image signal processor configured to generate first image data of a first resolution based on the first data signal, to generate second image data of a second resolution based on the second data signal, and to generate third image data of a third resolution based on the third data signal, and a main processor configured to perform high dynamic range (HDR) processing based on the first image data, the second image data, and the third image data, and, in a first zoom factor period, to obtain cropped image data from among the third image data that correspond to the second image data, and perform HDR processing based on the second image data and the cropped image data.

According to an embodiment, there is provided a method of processing an image by using a first image sensor block having a first field of view and a second image sensor block having a second field of view greater than the first field of view, the method including photographing, by the first image sensor block, an object to generate a first data signal corresponding to the object photographed at the first field of view, photographing, by the second image sensor block, the object to generate a second data signal corresponding to the object photographed at the second field of view, generating first image data of a first resolution based on the first data signal, generating second image data of a second resolution based on the second data signal, generating cropped image data from among the second image data that correspond to the first image data, and performing high dynamic range (HDR) processing based on the first image data and the cropped image data.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Below, embodiments of the inventive concept may be described in detail and clearly to such an extent that an ordinary one in the art easily implements the inventive concept. In the specification, an "object," a "background," a "scenery," etc. may mean an image targeted for image data to be obtained by an electronic device to be described with reference to FIGS. 1 to 18.

Figure 1:
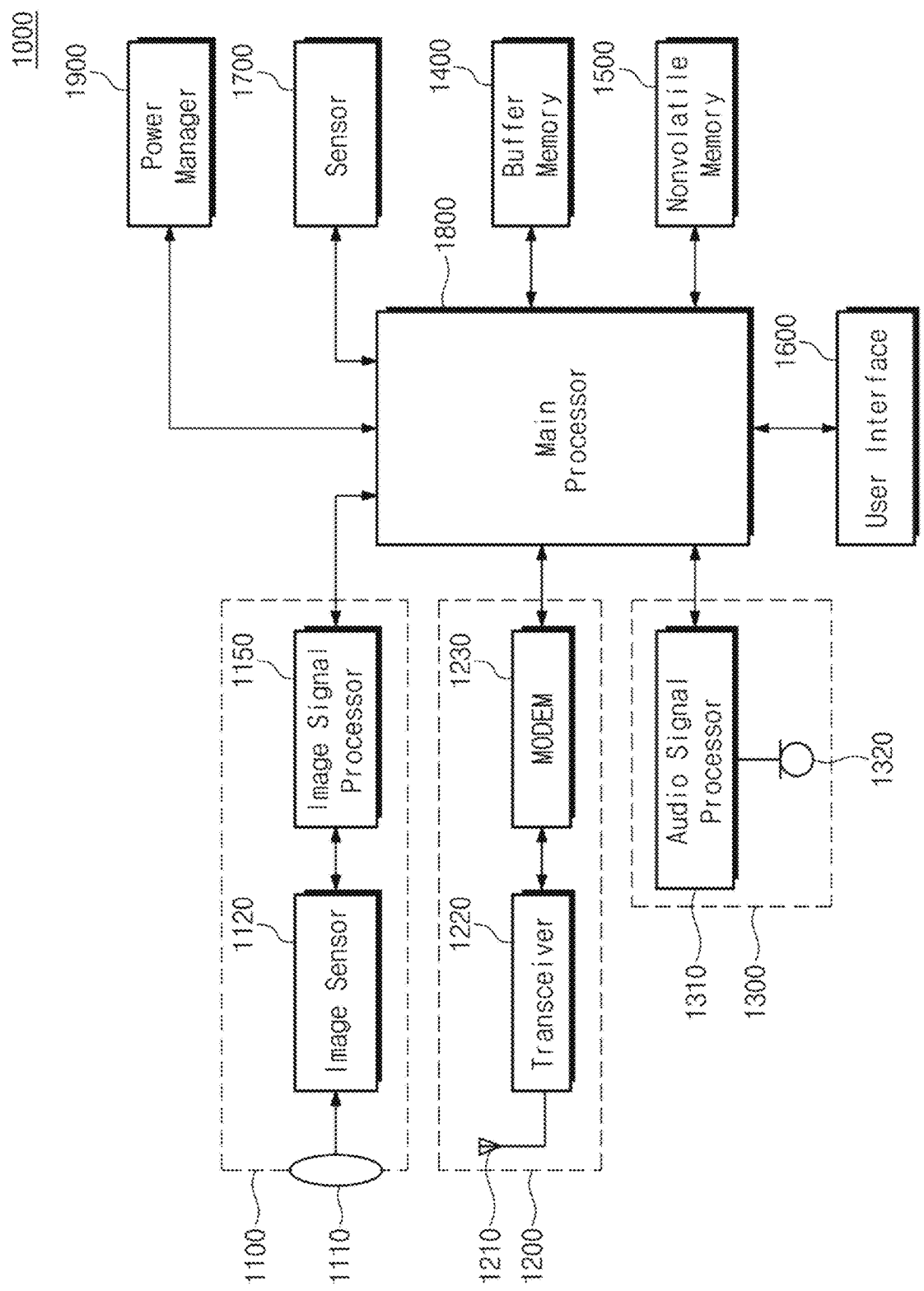
FIG. 1 is a block diagram illustrating an exemplary configuration of an electronic device including an electronic circuit according to an embodiment.

FIG. 1 is a block diagram illustrating an exemplary configuration of an electronic device including an electronic circuit according to an embodiment.

An electronic device 1000 may include various electronic circuits. For example, the electronic circuits of the electronic device 1000 may include an image processing block 1100, a communication block 1200, an audio processing block 1300, a buffer memory 1400, a nonvolatile memory 1500, a user interface 1600, a sensor 1700, a main processor 1800, and a power manager 1900.

The image processing block 1100 may include a lens 1110, an image sensor 1120, and an image signal processor 1150. For example, a light may be reflected by an external object, a background, and a scenery intended to be captured by a user, and the lens 1110 may receive the reflected light. The image sensor 1120 may generate an electrical signal based on the light received through the lens 1110. The image signal processor 1150 may generate image data associated with an image of the external object, the background, and the scenery by appropriately processing the electrical signal generated by the image sensor 1120. For ease of description, the term "object" may be used to indicate all of a background, a scenery, etc. as well as an object targeted or specifically focused for photographing.

The image sensor 1120 may include pixels that are arranged in a configuration along rows and columns, and the image sensor 1120 may convert light incident on the pixels to an electrical signal. Characteristics (e.g., the strength of current and the magnitude of voltage) of the electrical signal may vary with a characteristic (e.g., the intensity) of the received light. For example, the image sensor 1120 may be a charge coupled device (CCD) sensor, a complementary metal-oxide semiconductor (CMOS) sensor, etc.

One lens 1110 and one image sensor 1120 are illustrated in FIG. 1. However, in some embodiments, the image processing block 1100 may include a plurality of lenses and a plurality of image sensors. The plurality of image sensors may be provided to have different functions, different performances, and/or different characteristics. For example, each of the plurality of image sensors may include a plurality of lenses having different fields of view (FOV).

The image signal processor 1150 may include hardware circuits (e.g., an analog circuit and a logic circuit) configured to perform operations to be described in the present disclosure. Additionally or alternatively, the image signal processor 1150 may include one or more processor cores and may execute a program code configured to provide operations to be described in the present disclosure.

An example is illustrated in FIG. 1, as the image signal processor 1150 is included in the image processing block 1100. However, in some embodiments, the image signal processor 1150 may be provided as a part of the image sensor 1120, may be provided on a circuit or chip independent of the image processing block 1100, and/or may be provided as a part of the main processor 1800. It may be well understood that the present disclosure may be variously changed or modified with respect to hardware and software configurations and arrangements of components therein without limitation to the example of FIG. 1.

The communication block 1200 may exchange signals with an external device/system through an antenna 1210. A transceiver 1220 and a MODEM (Modulator/Demodulator) 1230 of the communication block 1200 may process the exchanged signals in compliance with various communication protocols. For example, the transceiver 1220 and the MODEM 1230 of the communication block 1200 may process signals, which are exchanged with the external device/system, in compliance with a wireless communication protocol such as long term evolution (LTE), worldwide interoperability for microwave access (WiMax), global system for mobile communication (GSM), code division multiple access (CDMA), Bluetooth, near field communication (NFC), wireless fidelity (Wi-Fi), or radio frequency identification (RFID).

The audio processing block 1300 may process sound information by using an audio signal processor 1310. The audio processing block 1300 may receive an audio input through a microphone 1320 or may output an audio through a speaker 1330.

The buffer memory 1400 may temporarily store data (e.g., data processed or to be processed by the main processor 1800) that are used for an operation of the electronic device 1000. For example, the buffer memory 1400 may include a volatile/nonvolatile memory such as a static random access memory (SRAM), a dynamic RAM (DRAM), a synchronous DRAM (SDRAM), a phase-change RAM (PRAM), a magneto-resistive RAM (MRAM), a resistive RAM (ReRAM), or a ferro-electric RAM (FRAM). For example, an image photographed by the image processing block 1100 or a video composed of images photographed by the image processing block 1100 may be stored in the buffer memory 1400. The main processor 1800 may perform HDR processing on the image or images stored in the buffer memory 1400.

The nonvolatile memory 1500 may store data regardless of whether a power is supplied. For example, the nonvolatile memory 1500 may include a nonvolatile memory such as a flash memory, a PRAM, an MRAM, a ReRAM, and a FRAM. For example, the nonvolatile memory 1500 may include a removable memory such as a hard disk drive (HDD), a solid state drive (SSD), a secure digital (SD) card, universal flash storage (UFS), and/or an embedded memory such as an embedded multimedia card (eMMC).

The user interface 1600 may enable communication between a user and the electronic device 1000 such that the user may control the electronic device 1000 via input of commands through the user interface 1600. For example, the user interface 1600 may include input interfaces such as a keypad, a button, a touch screen, a touch pad, a vision sensor, a motion sensor, and a gyroscope sensor. The user interface 1600 may also include output interfaces such as a liquid crystal display (LCD) device, a light emitting diode (LED) display device, an organic LED (OLED) display device, an active matrix OLED (AMOLED) display device, a motor, and an LED lamp for providing the user with information regarding the operations of the electronic device 1000.

The sensor 1700 may sense various types of physical energy provided from the outside of the electronic device 1000. For example, the sensor 1700 may sense a transfer medium of physical energy such as a temperature, a voice, and a light. For example, the sensor 1700 may sense illuminance and may transfer data indicating the sensed illuminance to the main processor 1800.

The main processor 1800 may perform various operations for controlling overall operations of the electronic device 1000. For example, the main processor 1800 may be implemented with a general-purpose processor, a dedicated processor, or an application processor and may include one or more processor cores. The main processor 1800 may control the image processing block 1100 for obtaining image data associated with an object outside the electronic device 1000. For example, the main processor 1800 may control the image processing block 1100 based on information provided from the sensor 1700.

The power manager 1900 may appropriately convert power received from a battery or an external power source. The power manager 1900 may supply the converted power to components of the electronic device 1000.

The exemplary components illustrated in FIG. 1 are provided for better understanding and are not intended to limit the present disclosure. The electronic device 1000 may not include one or more of the components illustrated in FIG. 1 or may further include at least one component not illustrated in FIG. 1.

Figure 2:
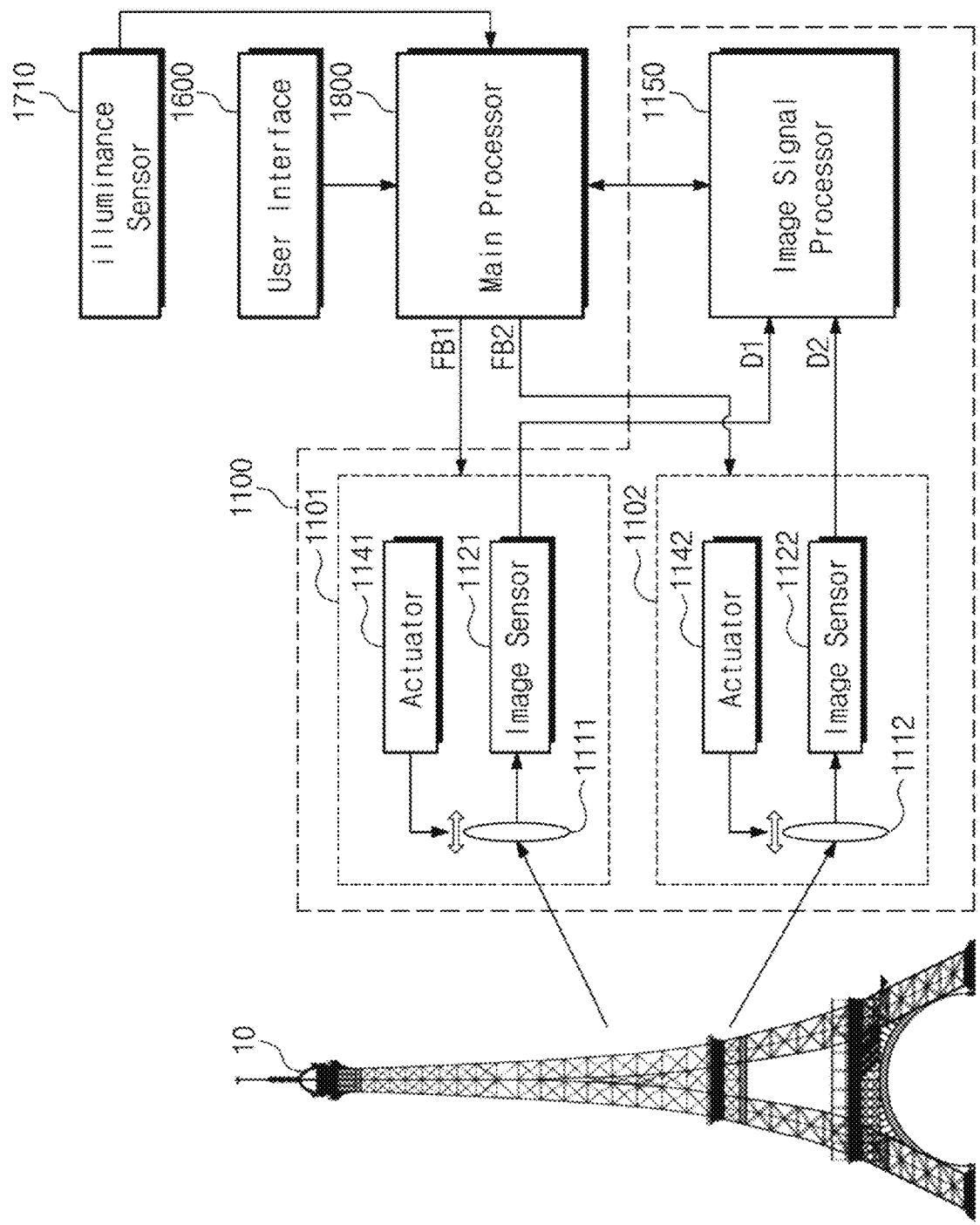
FIG. 2 is a diagram illustrating an exemplary configuration of an image processing block of FIG. 1.

FIG. 2 is a diagram illustrating an exemplary configuration of an image processing block of FIG. 1.

The image processing block 1100 may include image sensor blocks 1101 and 1102 and the image signal processor 1150. The user interface 1600, an illuminance sensor 1710, and the main processor 1800 are illustrated together to more completely describe an operation of the image processing block 1100. For example, the illuminance sensor 1710 may be implemented with a part of the sensor 1700 of FIG. 1.

The image processing block 1100 may be implemented by a dual sensor structure including two image sensors 1121 and 1122. For example, the first image sensor block 1101 may include a first lens 1111, a first actuator 1141, and a first image sensor 1121. Similarly, the second image sensor block 1102 may include a second lens 1112, a second actuator 1142, and a second image sensor 1122.

For example, an object 10 may be a target that a user of the electronic device 1000 intends to photograph. In response to a request of the user, the image processing block 1100 may generate a signal and data associated with an image of the object 10 under control of the main processor 1800. A light may be reflected from the object 10, and the reflected light may be received through the lenses 1111 and 1112. For example, the light collected by the first lens 1111 may be provided to the first image sensor 1121, and the light collected by the second lens 1112 may be provided to the second image sensor 1122.

The lenses 1111 and 1112 may be configured to collect the light from an object targeted for photographing at various fields of views. For example, the field of view at which the light is received by the first lens 1111 may be different from the field of view at which the light is received by the second lens 1112. The first lens 1111 may receive the light at the field of view narrower than a field of view of the second lens 1112. In contrast, the second lens 1112 may receive the light at the field of view wider than a field of view of the first lens 1111.

The first image sensor 1121 may generate a first signal D1 based on the light received from the first lens 1111, and the second image sensor 1122 may generate a second signal D2 based on the light received from the second lens 1112. For example, a first image that is based on the first signal D1 may be associated with an image of a relatively narrow field of view including the object 10, and the second signal D2 may be associated with an image of a relatively wide field of view.

The image sensors 1121 and 1122 may be provided to have different functions, different performances, and/or different characteristics. For example, the first image sensor 1121 may include a pixel array of a relatively low resolution to process the light received by the first lens 1111 having a relatively narrow field of view. In contrast, the second image sensor 1122 may include a pixel array of a relatively high resolution to process the light received by the second lens 1112 having a relatively wide field of view. Alternatively, the resolution of the pixel array of the first image sensor 1121 and the resolution of the pixel array of the second image sensor 1122 may be equal.

As a result, a dynamic range of the first image based on the first signal D1 output from the first image sensor 1121 may be different from a dynamic range of the second image based on the second signal D2 output from the second image sensor 1122. For example, the first image based on the first signal D1 may include a high quantity of relatively dark area, and the second image based on the second signal D2 may include a high quantity of relatively bright area. However, attributes of dynamic ranges of the first image and the second image are not limited thereto, and the attributes of the dynamic ranges may depend on various factors of the image sensors 1121 and 1122, such as illuminance and an exposure time.

In some embodiments, the image processing block 1100 may further include the actuators 1141 and 1142 for adjusting focal distances of the lenses 1111 and 1112. The first actuator 1141 may move a position of the first lens 1111, and thus, a focal distance of the first lens 1111 may be adjusted. The second actuator 1142 may move a position of the second lens 1112, and thus, a focal distance of the second lens 1112 may be adjusted. For example, each of the actuators 1141 and 1142 may be a mobile actuator.

For example, the focal distances of the lenses 1111 and 1112 may be adjusted by the actuators 1141 and 1142 such that the focal distances of the lenses 1111 and 1112 are different. For example, the actuators 1141 and 1142 may respectively include physical devices such as a motor for moving the lenses 1111 and 1112.

Besides, the image signal processor 1150 may variously process the signals D1 and D2. For example, the image signal processor 1150 may perform various signal processing such as pixel correction, demosaic, noise reduction, lens shading correction, gamma correction, and edge enhancement. The signals processed by the image signal processor 1150 may be output to the main processor 1800.

The main processor 1800 may perform high dynamic range (HDR) processing based on signals received from the image signal processor 1150. Thus, final image data may be generated. Exemplary HDR processing performed by the main processor 1800 will be more fully described with respect to subsequent embodiments.

The HDR-processed image data may be stored in an internal memory of the main processor 1800, the buffer memory 1400, and/or the nonvolatile memory 1500. The HDR-processed image data may indicate attributes such as a shape, a color, and a motion of the object 10. The HDR-processed image data may be provided to the user through an output interface (e.g., a display device) of the user interface 1600.

The main processor 1800 may control operations of the image sensors 1121 and 1122, the image signal processor 1150, and the actuators 1141 and 1142. For example, the main processor 1800 may signal the various components to control operation timings of the image sensors 1121 and 1122, the image signal processor 1150, and the actuators 1141 and 1142 in response to a user request (e.g., a button press, a screen touch, a motion, or a gesture) recognized through the user interface 1600.

For example, the illuminance of a photographing environment may be sensed by the illuminance sensor 1710. The main processor 1800 may be provided with data associated with the illuminance from the illuminance sensor 1710 and may control the image sensor blocks 1101 and 1102 by using control signals FB1 and FB2 that are based on the provided data.

For example, the user may input "zoom-in" or "zoom-out" commands via the input interface of the user interface 1600 for photographing an image. The zoom-in command may be associated with photographing an object at a narrow field of view, and the zoom-out command may be associated with photographing the object at a wide field of view.

For example, the zoom-in or zoom-out command may include information of a higher or lower zoom magnification. The zoom magnification may be a value indicating a depth of an object to be photographed from the electronic device or a width of an area including the object to be photographed. The main processor 1800 may control the actuators 1141 and 1142 based on the information indicated by the zoom magnification.

For example, the user may set a zoom condition for photographing an intended image by slowly or incrementally increasing or decreasing a value of the zoom magnification (e.g., stepwise or gradually) or selecting a particular value of the zoom magnification. To this end, the input interface of the user interface 1600 may receive the zoom magnification from the user. The HDR processing based on this user zoom factor will be more fully described with respect to subsequent embodiments.

The main processor 1800 may execute instruction sets of various program codes. For example, the main processor 1800 may execute instruction sets of an application (AP), a camera hardware abstraction layer (HAL), a camera driver (DRV), an image processing library (LIB), etc. The application may be executed in response to a request of the user, and may be, for example, a camera application, a movie maker application, etc.

Figure 3:
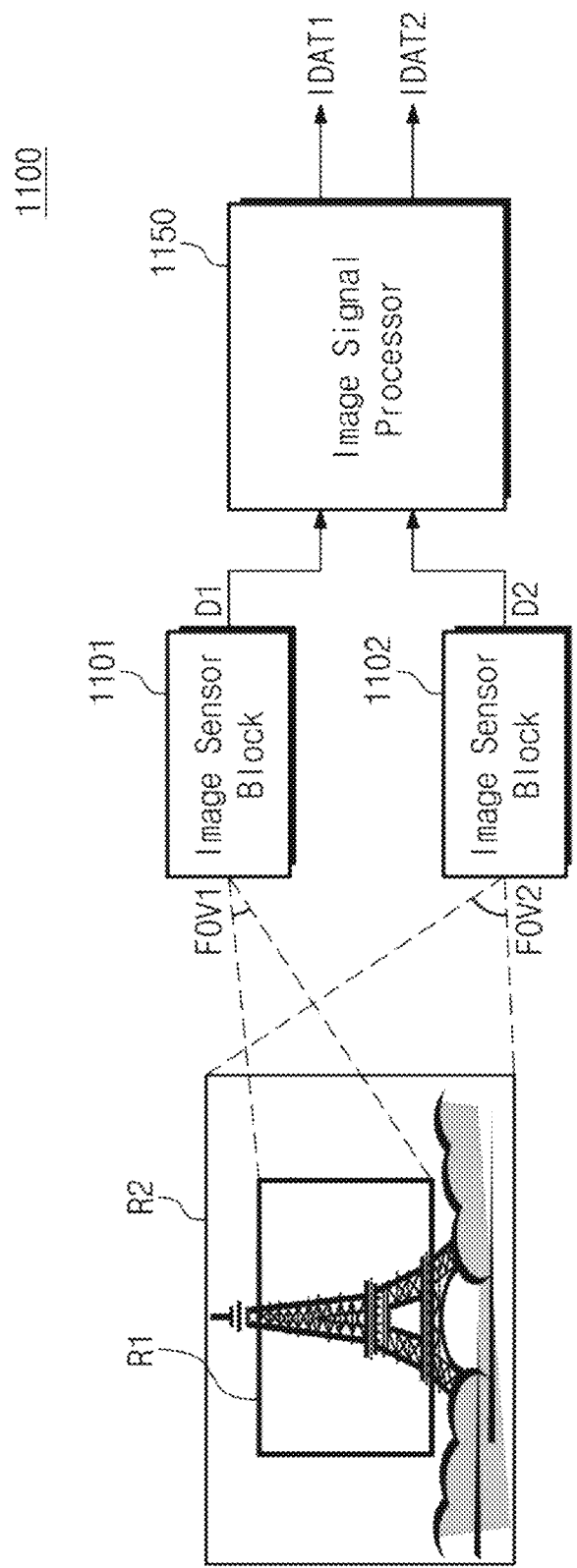
FIG. 3 is a block diagram illustrating exemplary operations of image sensor blocks of FIG. 2.

FIG. 3 is a block diagram illustrating exemplary operations of image sensor blocks of FIG. 2.

Referring to FIGS. 2 and 3, the first image sensor block 1101 may include the first image sensor 1121 for generating an image photographed at a first field of view FOV1 and the second image sensor 1122 for generating an image photographed at a second field of view FOV2. In addition, in this specification, "an image or image data having a particular field of view (or of a particular field of view) may mean "image data or an image output from an image sensor including a lens having a particular field of view."

In an embodiment, the second field of view FOV2 may be greater than the first field of view FOV1. Accordingly, the first image sensor block 1101 may operate to sense an image of a relatively narrow field of view, and the second image sensor block 1102 may operate to sense an image of a relatively wide field of view. For example, the first lens 1111 may be a wide lens, and the second lens 1112 may be an ultra-wide lens. Alternatively, the first lens 1111 may be a telephoto lens, and the second lens 1112 may be a wide lens.

For example, the first image sensor block 1101 may receive a light reflected by an object in a region R1 corresponding to the first field of view FOV1 and may generate the first signal D1 based on the received light. The second image sensor block 1102 may receive a light reflected by the object in a region R2 corresponding to the second field of view FOV2 and may generate the second signal D2 based on the received light.

The image signal processor 1150 may respectively generate first image data IDAT1 and second image data IDAT2 based on the first signal D1 and the second signal D2. A dynamic range of the first image data IDAT1 and a dynamic range of the second image data IDAT2 may be different from each other. For example, the first image data IDAT1 may include relatively dark brightness values, and the second image data IDAT2 may include relatively bright brightness values.

Afterwards, the main processor 1800 may perform HDR processing based on the first image data IDAT1 and the second image data IDAT2 having different brightness values. As a result, because an image having a wider dynamic range is obtained by the HDR processing, the quality of an image or the quality of a video composed of images may be improved.

For example, the image sensor blocks 1101 and 1102 may adjust the amount of light received from the an external surrounding environment of the electronic device 1000 under control of the main processor 1800. In an embodiment, the main processor 1800 may adjust shutter speeds of the image sensors 1121 and 1122 for adjusting the amount of light collected from the surrounding environment of the electronic device 1000. In another embodiment, the main processor 1800 may adjust aperture values of the image sensors 1121 and 1122 for adjusting the amount of light collected from the surrounding environment of the electronic device 1000.

To adjust the shutter speeds and/or aperture values of the image sensors 1121 and 1122, the main processor 1800 may signal to control mechanical devices included in the image sensors 1121 and 1122 or may signal to control pixels included in the image sensors 1121 and 1122. For example, the main processor 1800 may control operations of transistors included in pixels of the image sensors 1121 and 1122.

Figure 4:
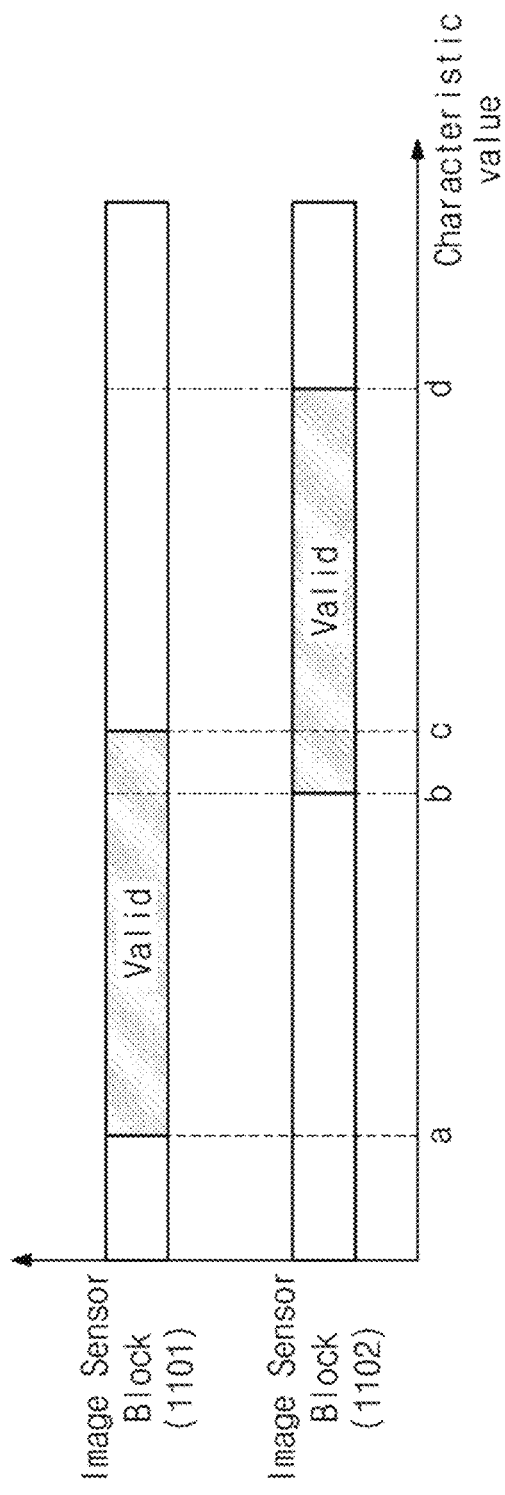
FIG. 4 is a conceptual diagram illustrating exemplary characteristics of image sensor blocks of FIG. 3.

FIG. 4 is a conceptual diagram illustrating exemplary characteristics of image sensor blocks of FIG. 3. Below, operations of the image sensor blocks 1101 and 1102 having different operating characteristics will be described with reference to FIGS. 2 and 4. In the example of FIG. 4, an x-axis represents a characteristic value.

The characteristic value may be associated with a brightness value of image data based on a signal output from an image sensor. As an example of the characteristic value, a luminance range of first image data that are based on the first signal D1 output from the first image sensor block 1101 may be different from a luminance range of second image data that are based on the second signal D2 output from the second image sensor block 1102. For example, a maximum value (i.e., value "c") of the luminance range of the first image data may be smaller than a maximum value (i.e., value "d") of the luminance range of the second image data. For example, at least a portion of the luminance range of the first image data may overlap at least a portion of the luminance range of the second image data or may not overlap at least a portion of the luminance range of the second image data.

As another example of the characteristic value, a dynamic range of the first image data that are based on the first signal D1 output from the first image sensor block 1101 may be different from a dynamic range of the second image data that are based on the second signal D2 output from the second image sensor block 1102. For example, a maximum value (i.e., value "c") of the dynamic range of the first image data may be smaller than a maximum value (i.e., value "d") of the dynamic range of the second image data. That a value of the dynamic range is relatively large may mean that a ratio of a bright region in an image is correspondingly large. For example, at least a portion of the dynamic range of the first image data may overlap at least a portion of the dynamic range of the second image data or may not overlap at least a portion of the dynamic range of the second image data.

As another example of the characteristic value, the characteristic value may be a value associated with a physical characteristic of an image sensor itself. For example, the characteristic value may be associated with the number of physical pixels constituting a pixel array. In this configuration, unlike the example of FIG. 4 in which a characteristic value is expressed by a range, the characteristic value may be a single fixed value. For example, the resolution of the pixel array of the first image sensor block 1101 and the resolution of the pixel array of the second image sensor block 1102 may be different from each other. For example, the first image sensor block 1101 may include a pixel array that is appropriate to process the light received by the first lens 1111 having a relatively narrow field of view. The second image sensor block 1102 may include a pixel array that is appropriate to process the light received by the second lens 1112 having a relatively wide field of view.

Figure 5:
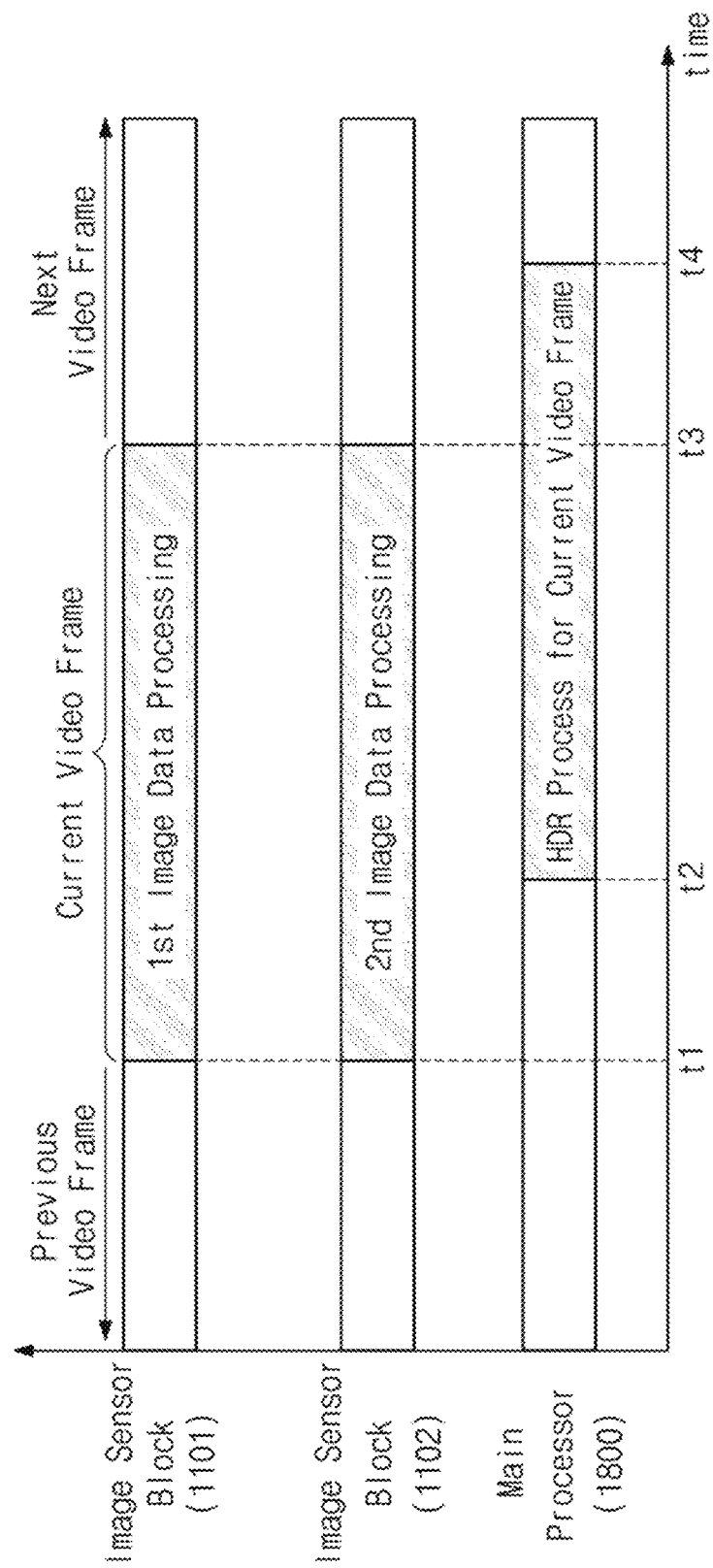
FIG. 5 is a timing diagram illustrating operations of image sensor blocks and a main processor of FIG. 2.

FIG. 5 is a timing diagram illustrating operations of image sensor blocks and a main processor of FIG. 2.

Between a first time t1 and a third time t3, the image sensor blocks 1101 and 1102 may operate to obtain image data corresponding to a current video frame. The image sensor blocks 1101 and 1102 may respectively output the signals D1 and D2 indicating the obtained image data.

After the first time t1, the image digital signal processor 1150 may receive the signals D1 and D2 from the image sensor blocks 1101 and 1102. The image signal processor 1150 may obtain first image data and second image data based on the signals D1 and D2. Between a second time t2 and a fourth time t4, the main processor 1800 may perform HDR processing based on the first image data and the second image data respectively corresponding to different fields of view.

In the example of FIG. 5, the image sensor blocks 1101 and 1102 may operate during the same time period for obtaining image data of different brightness values to be used for the HDR processing. As the image sensor blocks 1101 and 1102 operate during the same time period, the image data to be used for the HDR processing may be more quickly obtained in real time. Accordingly, the electronic device 1000 may obtain image data HDR-processed through the operations of the image sensor blocks 1101 and 1102 and the image signal processor 1150 in real time.

Figure 6:
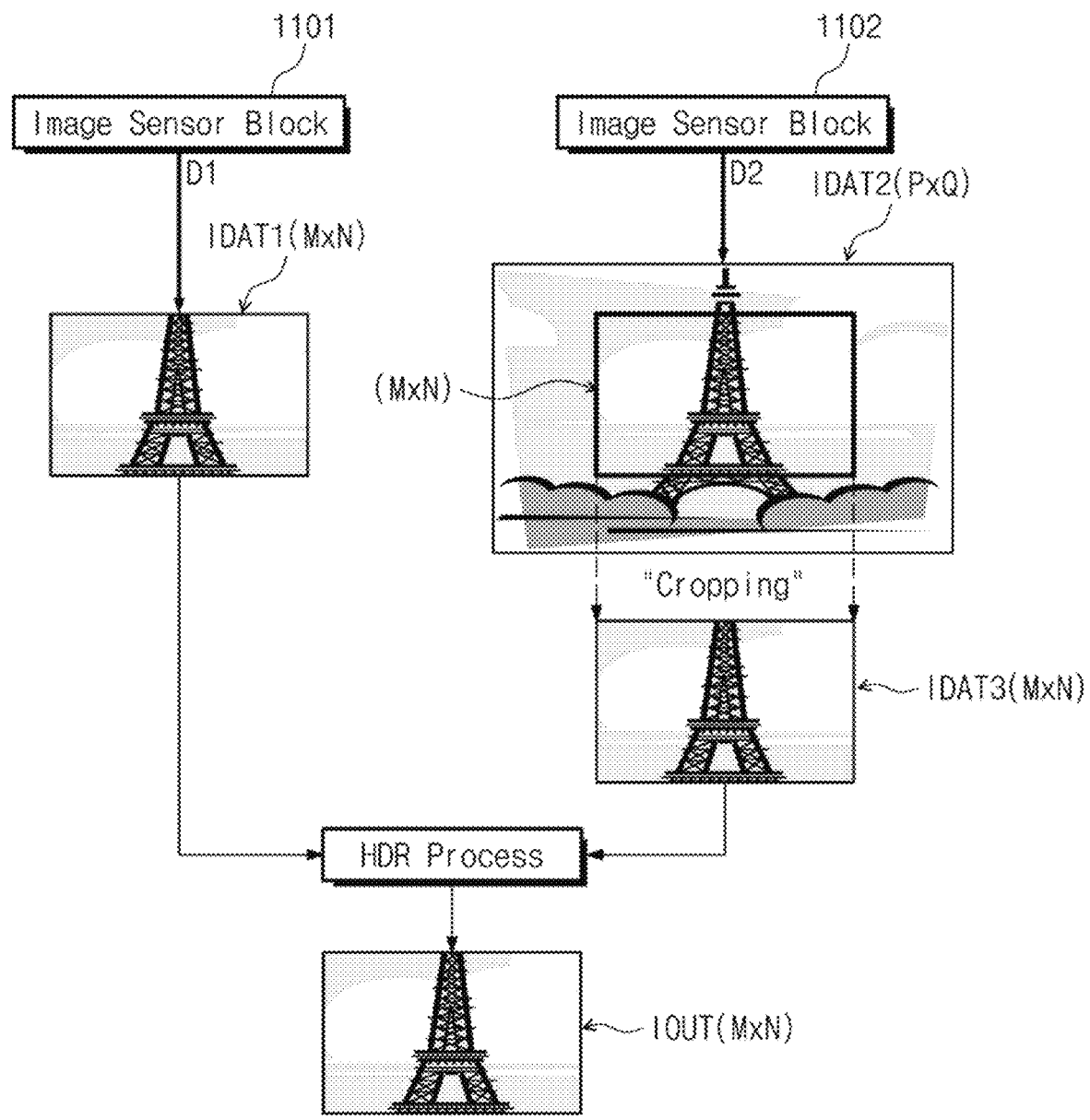
FIG. 6 is a diagram illustrating an operation for HDR processing according to an embodiment.

FIG. 6 is a diagram illustrating an operation for HDR processing according to an embodiment.

How the HDR processing is performed on two images having different fields of view will be described with reference to FIGS. 2, 4, and 6. The image signal processor 1150 may obtain the first image data IDAT1 based on the first signal D1 received from the first image sensor block 1101 and may obtain the second image data IDAT2 based on the second signal D2 received from the second image sensor block 1102. For example, the image sensor blocks 1101 and 1102 may respectively obtain the first image data IDAT1 and the second image data IDAT2 by sensing the light received from lenses having different fields of view.

For example, the first image sensor 1121 may include a pixel array composed of "N" columns each including "M" pixels (or composed of "M" rows each including "N" pixels). Accordingly, the size of the first image data IDAT1 may be "M pixels×N pixels." Similarly, the second image sensor 1122 may include a pixel array composed of "P" columns each including "Q" pixels (or composed of "Q" rows each including "P" pixels). Accordingly, the size of the second image data IDAT2 may be "P pixels×Q pixels." In an embodiment, "P" may be greater than "M," and "Q" may be greater than "N." That is, the resolution of the second image data IDAT2 may be greater than the resolution of the first image data IDAT1. Accordingly, a brightness value (or a range of brightness values) of the first image data IDAT1 and a brightness value (or a range of brightness values) of the second image data IDAT2 may be different from each other.

However, in another embodiment, "P" and "M" may be equal, and "Q" and "N" may be equal. In this configuration, a resolution of the first image data IDAT1 may be equal to a resolution of the second image data IDAT2, and a brightness value (or a range of brightness values) of the first image data IDAT1 and a brightness value (or a range of brightness values) of the second image data IDAT2 may be different from each other. However, for convenience of description in the specification, the description will be given under the assumption that resolutions of image data respectively output from image sensor blocks are different. In addition, as the assumption of the HDR processing for obtaining a wider dynamic range, embodiments are described in the assumption that brightness values (or ranges of brightness values) of image data respectively output from image sensor blocks are different.

Below, for ease of understanding, "M pixels×N pixels" being the size of image data is referred to as "M×N." In the specification, the case where the size of image data is expressed by "M×N" means that the image data indicate data expressed by a discontinuous unit (e.g., a pixel) included in M rows and N columns.

As in the above description, the second image sensor 1122 may include a pixel array composed of "Q" columns each including "P" pixels (or composed of "P" rows each including "Q" pixels). That is, the size of the second image data IDAT2 may be "P×Q."

The main processor 1800 may crop a portion of the second image data IDAT2. The main processor 1800 may crop a portion, which corresponds to the first image data IDAT1, of the second image data IDAT2. The size of image data, which belongs to a region corresponding to the first image data IDAT1, of the second image data IDAT2 may be "M×N." For example, the size of the cropped region being "M×N" may be, but is not limited to, half or less of the size of the second image data IDAT2 being "P×Q." Third image data IDAT3 of "M×N" may be generated as a cropping result.

As described with reference to FIG. 4, the image sensor blocks 1101 and 1102 may respectively obtain the first image data IDAT1 and the second image data IDAT2 having different brightness values, by a characteristic of an image sensor block itself. As a result, a brightness value (or a range of brightness values) of the first image data IDAT1 and a brightness value (or a range of brightness values) of the third image data IDAT3 may be different from each other. The main processor 1800 may receive the first image data IDAT1 and the third image data IDAT3 from the image signal processor 1150 and may perform HDR processing based on the received image data. The main processor 1800 may obtain image data IOUT corresponding to the current video frame through the HDR processing.

An image indicated by the HDR-processed image data IOUT may include a dynamic range of the first image data IDAT1 and a dynamic range of the third image data IDAT3. In other words, an image having a dynamic range (i.e., "a" to "d") wider than the dynamic range (i.e., "a" to "c") of the first image data IDAT1 or the dynamic range (i.e., "b" to "d") of the third image data IDAT3 may be obtained through the HDR processing.

Meanwhile, the embodiment of FIG. 6 may relate to the HDR processing for a video. However, in the case of applying the HDR processing method of the present disclosure to photographs, a brightness value of image data may be artificially adjusted by adjusting an exposure value. For example, in the case where ambient brightness is very bright, the illuminance sensor 1710 (refer to FIG. 2) may sense the ambient brightness and may transfer information about the ambient brightness to the main processor 1800. The main processor 1800 may adjust an exposure value of at least one of the image sensor blocks 1101 and 1102 based on the ambient brightness information. As a result, an image having a wider dynamic range may be obtained through the HDR processing.

Figure 7:
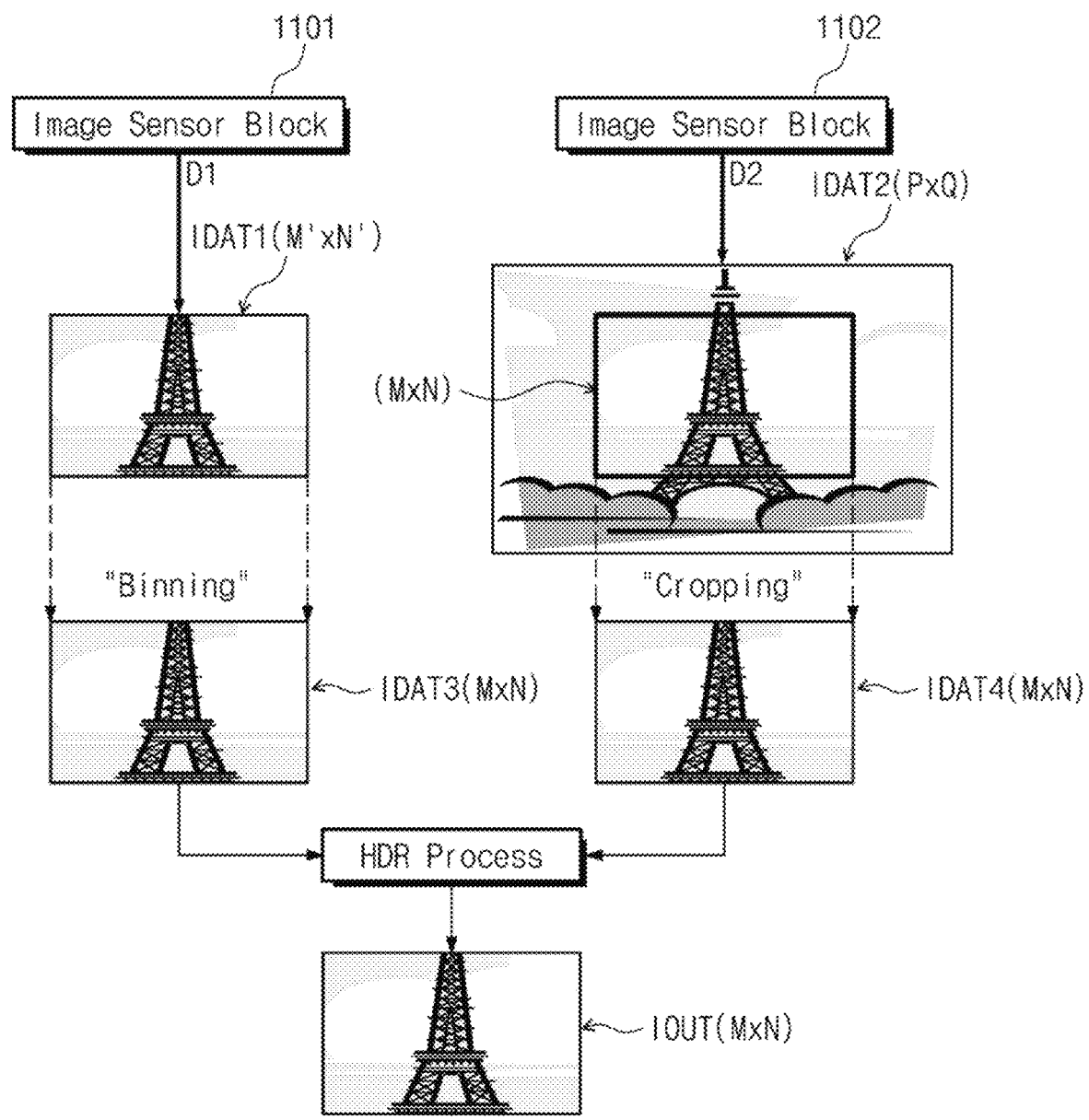
FIG. 7 is a diagram illustrating an operation for HDR processing according to an embodiment.

FIG. 7 is a diagram illustrating an operation for HDR processing according to an embodiment.

How HDR processing is performed on two images having different fields of view will be described with reference to FIGS. 2 and 7. The image signal processor 1150 may obtain the first image data IDAT1 based on the first signal D1 received from the first image sensor block 1101 and may obtain the second image data IDAT2 based on the second signal D2 received from the second image sensor block 1102. The size of the first image data IDAT1 may be M'×N', and the size of the second image data IDAT2 may be "P×Q." In an embodiment, "P" may be greater than M', and "Q" may be greater than N.' That is, the resolution of the second image data IDAT2 may be greater than the resolution of the first image data IDAT1. For example, a brightness value (or a range of brightness values) of the first image data IDAT1 and a brightness value (or a range of brightness values) of the second image data IDAT2 may be different from each other.

In an embodiment, the resolution of the first image data IDAT1 corresponding to M'×N' may be greater than the resolution (i.e., M×N) of a region, which corresponds to the first image data IDAT1, of the second image data IDAT2. That is, "M" may be smaller than M', and "N" may be smaller than N.' In this configuration, prior to performing HDR processing, there is no need to adjust the resolution of image data being the basis of the HDR processing.

For example, the main processor 1800 may perform binning on the first image data IDAT1. The main processor 1800 may perform binning depending on various types of algorithms. The main processor 1800 may obtain the third image data IDAT3 of "M×N" by performing binning on the first image data IDAT1 of M'×N.'

The main processor 1800 may crop a portion of the second image data IDAT2. The main processor 1800 may crop image data, which correspond to the third image data IDAT3, of the second image data IDAT2. The cropping described with reference to FIG. 7 is similar to the cropping described with reference to FIG. 6, and thus additional description will be omitted to avoid redundancy. Fourth image data IDAT4 of "M×N" may be generated as a cropping result.

Because the third image data IDAT3 are obtained by binning a region corresponding to the first image data IDAT1 and the fourth image data IDAT4 are obtained by performing cropping on the second image data IDAT2, an image indicated by the third image data IDAT3 and an image indicated by the fourth image data IDAT4 may correspond to each other. For example, the image indicated by the third image data IDAT3 and the image indicated by the fourth image data IDAT4 may be mostly similar except for a brightness value.

Because a brightness value (or a range of brightness values) of the first image data IDAT1 and a brightness value (or a range of brightness values) of the second image data IDAT2 are different from each other, a brightness value (or a range of brightness values) of the third image data IDAT3 and a brightness value (or a range of brightness values) of the fourth image data IDAT4 may be different from each other. The main processor 1800 may perform HDR processing based on the third image data IDAT3 and the fourth image data IDAT4 having different brightness values. The main processor 1800 may obtain the image data IOUT through the HDR processing.

According to the embodiment of FIG. 7, because the binning is performed on the first image data IDAT1 prior to the HDR processing, the amount of data to be HDR-processed decreases. Accordingly, a speed at which the HDR processing is performed may be correspondingly increased, and power consumption of the main processor 1800 may be correspondingly reduced.

Figure 8:
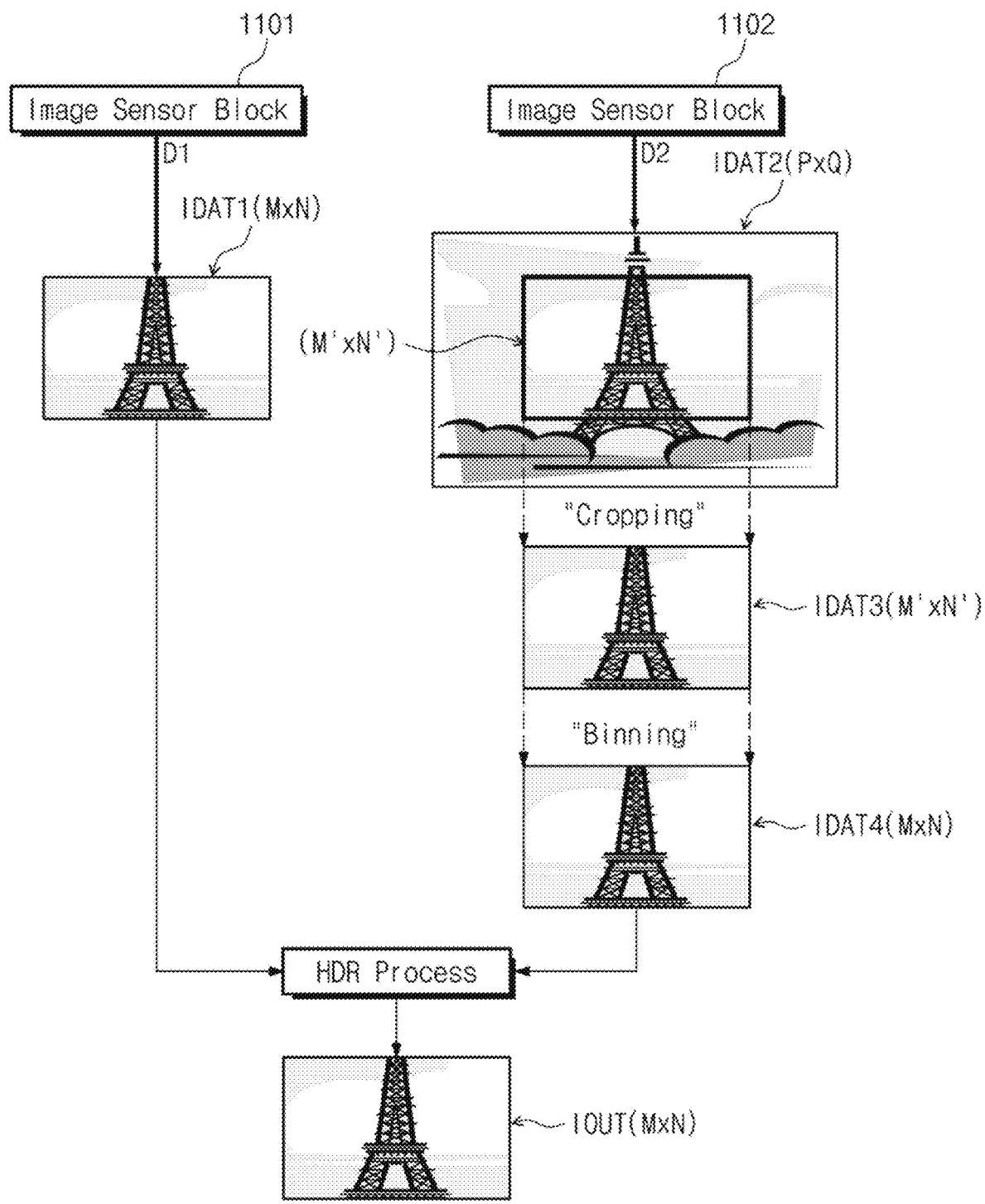
FIG. 8 is a diagram illustrating an operation for HDR processing according to an embodiment.

FIG. 8 is a diagram illustrating an operation for HDR processing according to an embodiment.

In the embodiment of FIG. 7, there is described the HDR processing associated with the a configuration in which the resolution of the first image data IDAT1 is greater than the resolution (i.e., M×N) of a region, which corresponds to the first image data IDAT1, of the second image data IDAT2. In contrast, the embodiment of FIG. 8 relates to the HDR processing associated with the configuration in which the resolution (i.e., M×N) of the first image data IDAT1 is smaller than the resolution (i.e., M'×N') of a region, which corresponds to the first image data IDAT1, of the second image data IDAT2 (i.e., M<M' and N<N').

The image signal processor 1150 may generate the first image data IDAT1 of "M×N" based on the first signal D1 output from the first image sensor block 1101. The image signal processor 1150 may generate the second image data IDAT2 of "P×Q" based on the second signal D2 output from the second image sensor block 1102.

The main processor 1800 may crop image data, which correspond to the first image data IDAT1, of the second image data IDAT2. The third image data IDAT3 of M'×N' may be generated as a cropping result. However, because the resolution of the first image data IDAT1 and the resolution of the third image data IDAT3 are different from each other, immediately performing the HDR processing should be delayed. Accordingly, an additional operation for the third image data IDAT3 may be required. For example, the main processor 1800 may obtain the fourth image data IDAT4 of "M×N" by performing binning on the third image data IDAT3 of M'×N.' As a result of the cropping and binning, the size of the first image data IDAT1 and the size of the fourth image data IDAT4 may be equal, that is, may be "M×N."

Because a brightness value (or a range of brightness values) of the first image data IDAT1 and a brightness value (or a range of brightness values) of the second image data IDAT2 are different from each other, a brightness value (or a range of brightness values) of the first image data IDAT1 and a brightness value (or a range of brightness values) of the fourth image data IDAT4 may be different from each other. The main processor 1800 may perform HDR processing based on the first image data IDAT1 and the fourth image data IDAT4 having different brightness values. The main processor 1800 may obtain the image data IOUT through the HDR processing.

Figure 9:
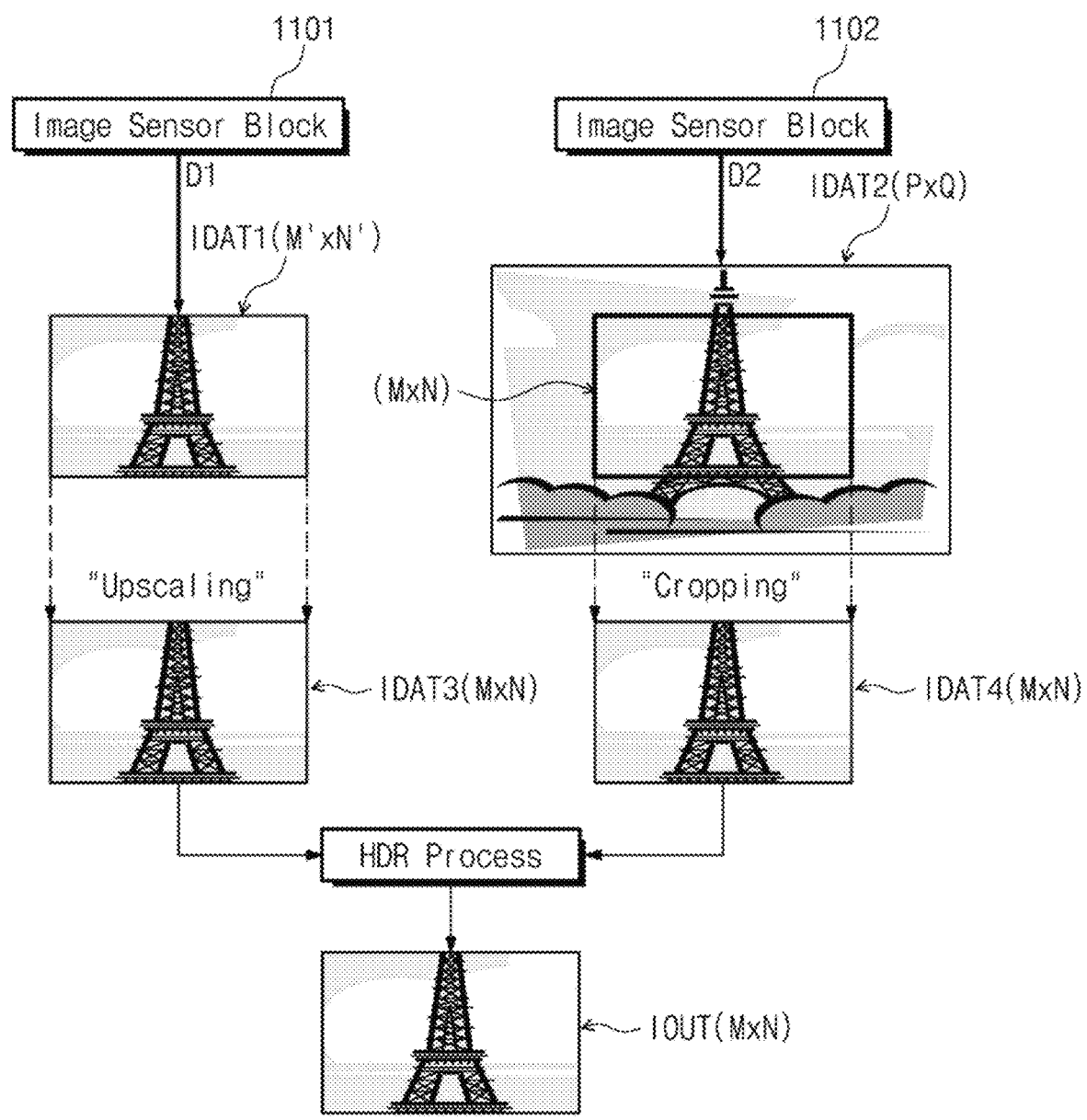
FIG. 9 is a diagram illustrating an operation for HDR processing according to an embodiment.

FIG. 9 is a diagram illustrating an operation for HDR processing according to an embodiment.

In the embodiment of FIG. 8, there is described an additional operation that is performed on the second image data IDAT2 when the resolution of the first image data IDAT1 is smaller than the resolution of a region, which corresponds to the first image data IDAT1, of the second image data IDAT2. However, in the embodiment of FIG. 9, an additional operation is performed on the first image data IDAT1 when the resolution of the first image data IDAT1 is smaller than the resolution of a region, which corresponds to the first image data IDAT1, of the second image data IDAT2 (i.e., M>M' and N>N').

The image signal processor 1150 may generate the first image data IDAT1 of M'×N' based on the first signal D1 output from the first image sensor block 1101. The image signal processor 1150 may generate the second image data IDAT2 of "P×Q" based on the second signal D2 output from the second image sensor block 1102.

The main processor 1800 may obtain the third image data IDAT3 of "M×N" by performing upscaling on the first image data IDAT1 of M'×N.' The main processor 1800 may perform upscaling depending on various types of algorithms. The main processor 1800 may crop a portion of the second image data IDAT2. The main processor 1800 may crop image data, which correspond to the third image data IDAT3, of the second image data IDAT2. The fourth image data IDAT4 of "M×N" may be generated as a cropping result, and the size of the third image data IDAT3 and the size of the fourth image data IDAT4 may be equal.

Because a brightness value of the first image data IDAT1 and a brightness value of the second image data IDAT2 are different from each other, a brightness value of the third image data IDAT3 and a brightness value of the fourth image data IDAT4 may be different from each other. The main processor 1800 may perform HDR processing based on the third image data IDAT3 and the fourth image data IDAT4 having different brightness values. The main processor 1800 may obtain the image data IOUT through the HDR processing.

Figure 10:
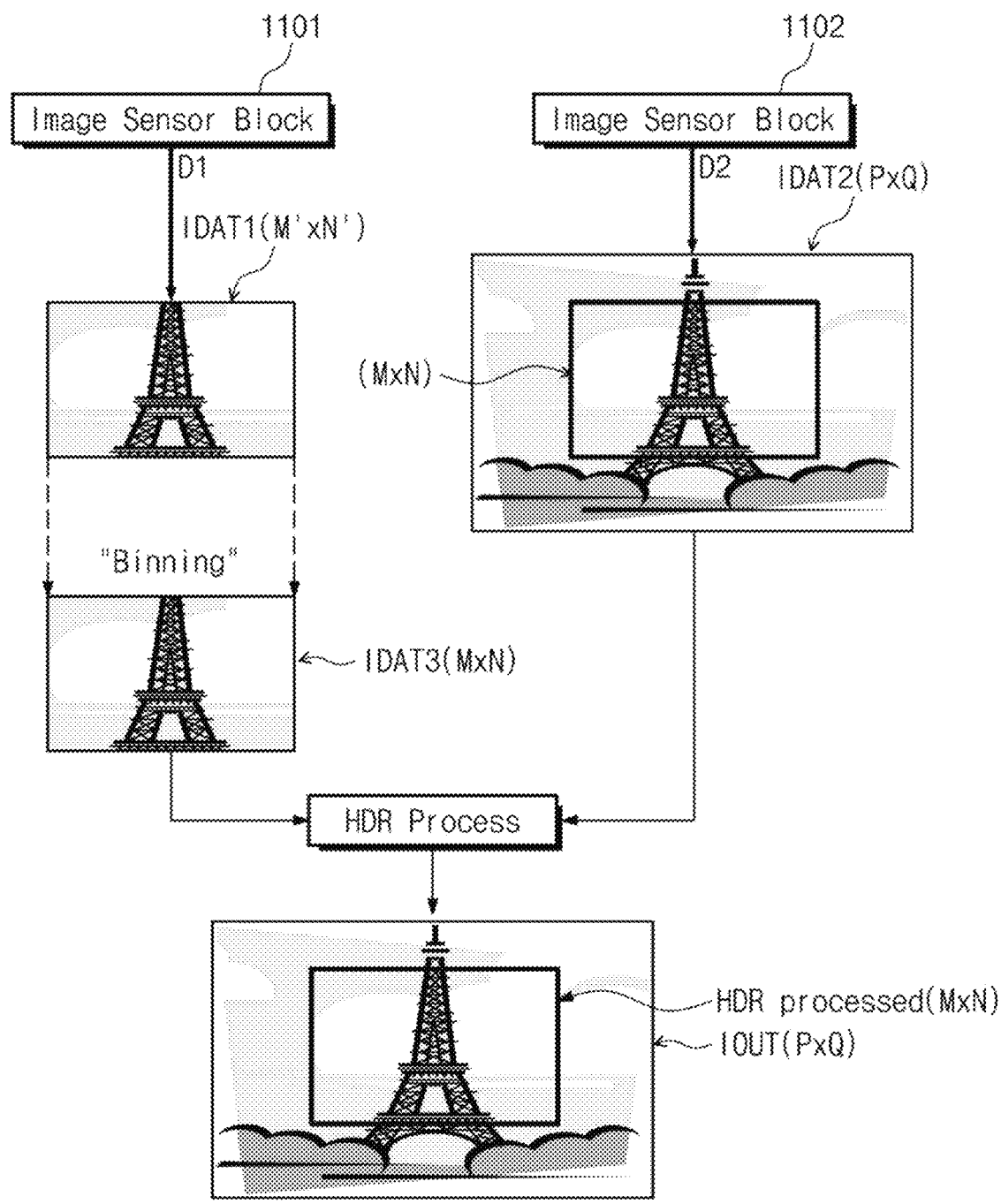
FIG. 10 is a diagram illustrating an operation for HDR processing according to an embodiment.

FIG. 10 is a diagram illustrating an operation for HDR processing according to an embodiment.

The embodiment of FIG. 10 is similar to the embodiment of FIG. 7. However, in the embodiment of FIG. 10, the cropping may not be performed on the second image data IDAT2 prior to the HDR processing. Accordingly, in the embodiments of FIGS. 7 to 9, a result of the HDR processing may be provided to the user through a user interface (e.g., a display) depending on the size of an image photographed by the first image sensor block 1101 (or the size of an image obtained as a result of performing binning the image photographed by the first image sensor block 1101). In contrast, in the embodiment of FIG. 10, a result of the HDR processing may be provided to the user through a user interface depending on the size of an image photographed by the second image sensor block 1102.

The image signal processor 1150 may obtain the first image data IDAT1 of M'×N' based on the first signal D1 received from the first image sensor block 1101 and may obtain the second image data IDAT2 of "P×Q" based on the second signal D2 received from the second image sensor block 1102. However, because the size of the first image data IDAT1 and the size of a region, which corresponds to the first image data IDAT1, of the second image data IDAT2 are different from each other, additional processing is required with regard to the first image data IDAT1.

For example, the main processor 1800 may obtain the third image data IDAT3 of "M×N" by performing binning on the first image data IDAT1 of M'×N.' The main processor 1800 may perform HDR processing based on the third image data IDAT3 and the second image data IDAT2 and may obtain the image data IOUT through the HDR processing.

Figure 11:
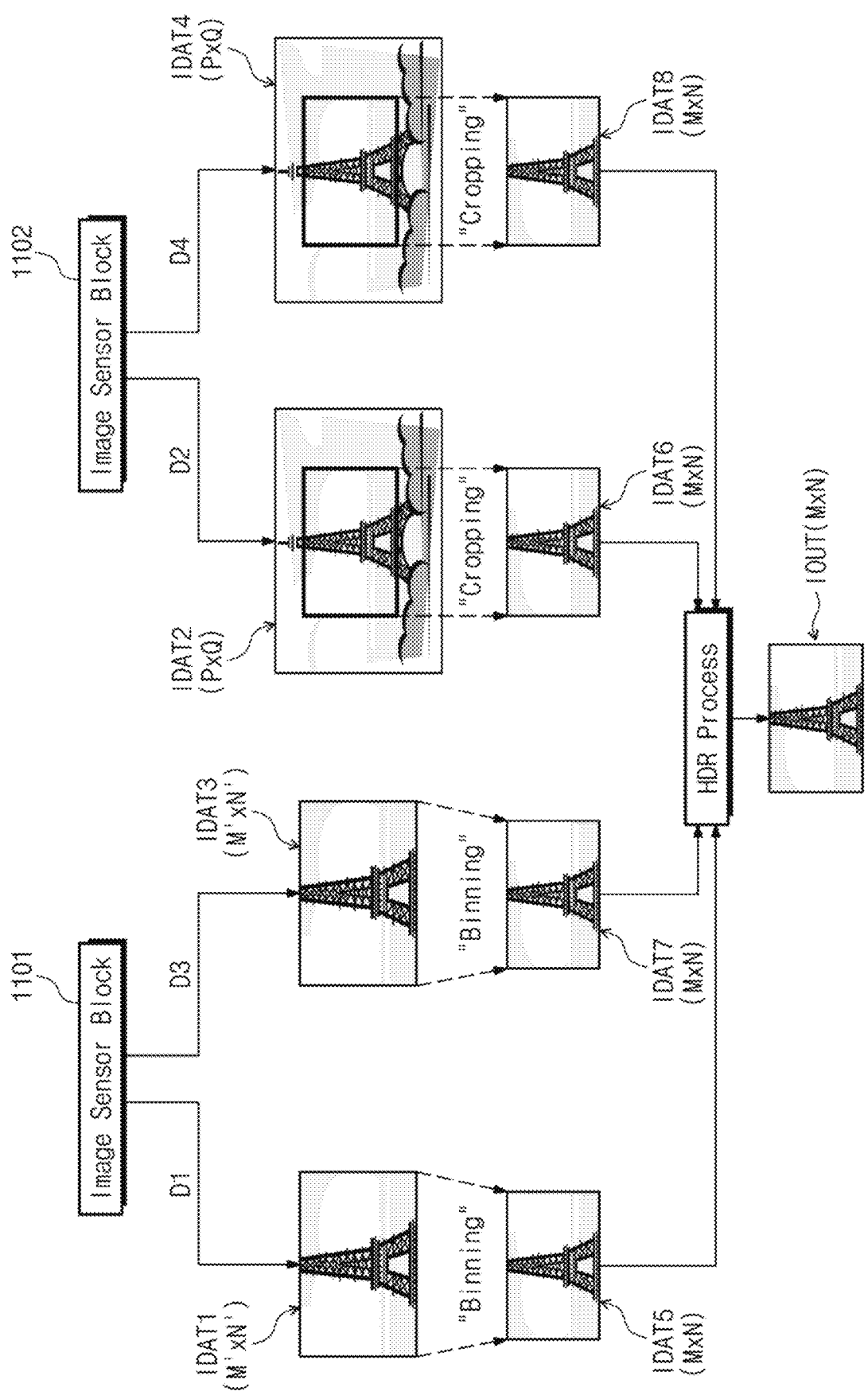
FIG. 11 is a diagram illustrating operations for HDR processing according to an embodiment.

FIG. 11 is a diagram illustrating operations for HDR processing according to an embodiment.

The embodiments described with reference to FIGS. 6 to 9 may be associated with HDR processing of each frame of a video photographed in real time or HDR processing of an image photographed in a moment. However, the embodiment of FIG. 11 may be associated with HDR processing of an image photographed in a moment. Alternatively, the embodiment of FIG. 11 may be associated with HDR processing of a plurality of images extracted from a video photographed in advance.

In the configuration of a sufficiently short difference between a time period between a time at which the first image data IDAT1 are obtained by the first image sensor block 1101 and a time at which the third image data IDAT3 are obtained, an image indicated by the first image data IDAT1 and an image indicated by the third image data IDAT3 may correspond to each other. As in the above description, an image indicated by the second image data IDAT2 and an image indicated by the fourth image data IDAT4 may correspond to each other.

The image signal processor 1150 may sequentially obtain the image data IDAT1 and IDAT3 based on signals D1 and D3 sequentially received from the first image sensor block 1101. The image signal processor 1150 may sequentially obtain the image data IDAT2 and IDAT4 based on signals D2 and D4 sequentially received from the second image sensor block 1102.

The size of the first image data IDAT1 and the size of the third image data IDAT3 may be M'×N', and the size of the second image data IDAT2 and the size of the fourth image data IDAT4 may be "P×Q." For example, brightness values of the first image data IDAT1 to the fourth image data IDAT4 may be different from each other.

The main processor 1800 may perform binning on the first image data IDAT1 and the third image data IDAT3. The main processor 1800 may obtain fifth image data IDAT5 of "M×N" by performing binning on the first image data IDAT1 of M'×N' and may obtain seventh image data IDAT7 of "M×N" by performing binning on the third image data IDAT3 of M'×N.' The main processor 1800 may obtain sixth image data IDAT6 of "M×N" by cropping image data of "M×N," which correspond to the fifth image data IDAT5 or the seventh image data IDAT7, of the second image data IDAT2. The main processor 1800 may obtain eighth image data IDAT8 of "M×N" by cropping image data of "M×N," which correspond to the fifth image data IDAT5 or the seventh image data IDAT7, of the fourth image data IDAT4.

Because brightness values of the first image data IDAT1 to the fourth image data IDAT4 are different from each other, brightness values of the fifth image data IDAT5 to the eighth image data IDAT8 may be different from each other. The main processor 1800 may perform HDR processing based on the fifth image data IDAT5 to the eighth image data IDAT8 having different brightness values. The main processor 1800 may obtain the image data IOUT through the HDR processing.

However, the HDR processing method of the main processor 1800 is not limited thereto. For example, the main processor 1800 may perform HDR processing based on some (e.g., IDAT5, IDAT7, and IDAT8) of the fifth image data IDAT5 to the eighth image data IDAT8. For example, the main processor 1800 may perform first HDR processing on the fifth image data IDAT5 and the sixth image data IDAT6, and may perform second HDR processing on the seventh image data IDAT7 and the eighth image data IDAT8. The main processor 1800 may perform third HDR processing based on a result of the first HDR processing and a result of the second HDR processing. In an embodiment, HDR processing may be performed based on various image data capable of being combined from the image data IDAT5, IDAT6, IDAT7, and IDAT8.

Meanwhile, the embodiment of FIG. 11 is described as HDR processing is performed based on the cropping and binning described with reference to FIG. 7, but the embodiments are not limited thereto. For example, at least one of HDR processing schemes described with reference to FIGS. 6 and 8 to 10 may be applied to the embodiment of FIG. 11.

Figure 12:
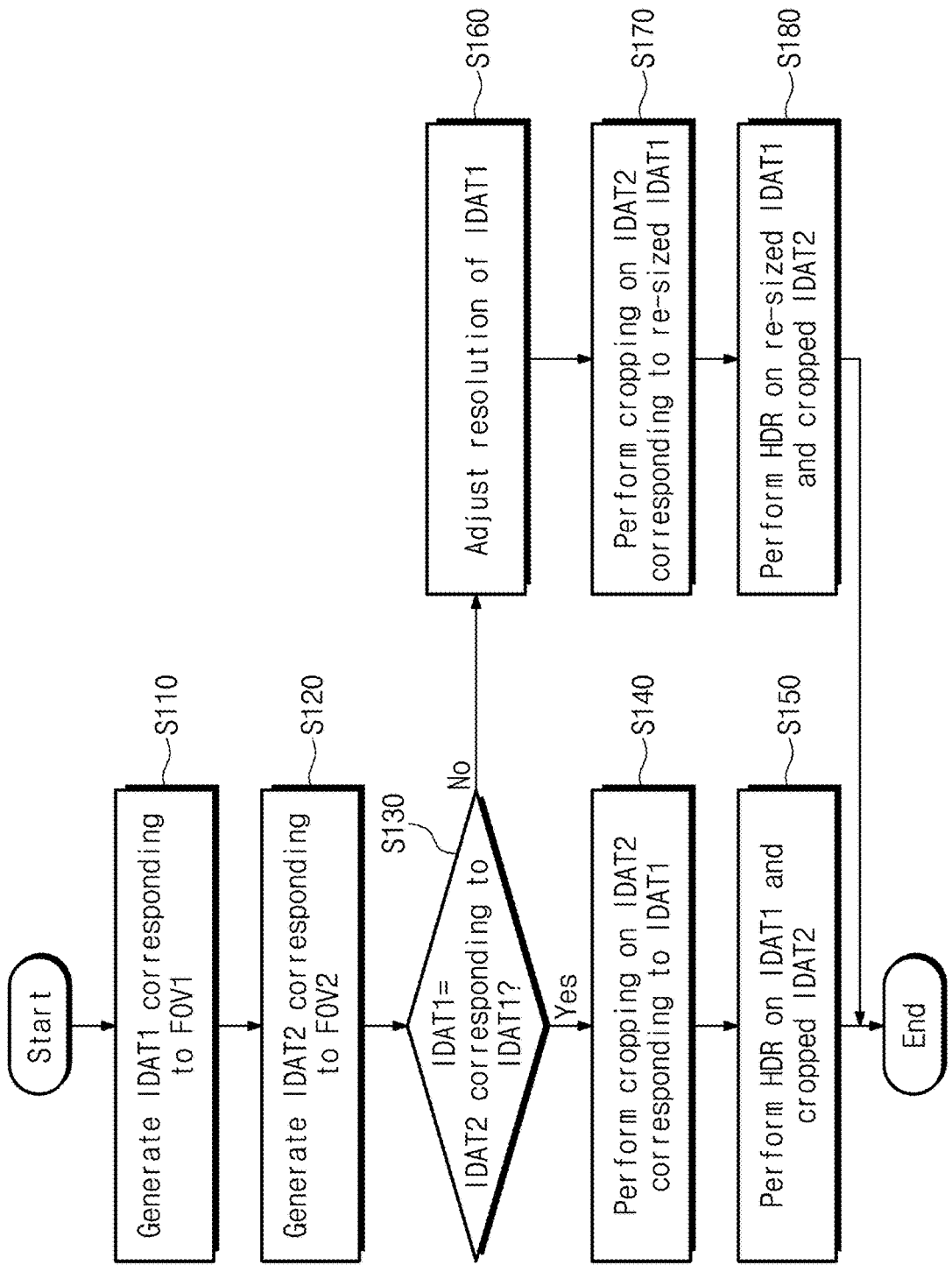
FIG. 12 is a flowchart illustrating an image processing method according to an embodiment.

FIG. 12 is a flowchart illustrating an image processing method according to an embodiment.

Referring to FIGS. 2, 3, and 12 taken in conjunction, in operation S110, the first image sensor block 1101 generates the first signal D1 corresponding to the first field of view FOV1. For example, the first signal D1 may be based on a light incident through the first lens 1111 having the first field of view FOV1 being relatively narrow. The image signal processor 1150 may generate the first image data IDAT1 based on the first signal D1.

In operation S120, the second image sensor block 1102 generates the second signal D2 corresponding to the second field of view FOV2. The image signal processor 1150 may generate the second image data IDAT2. For example, the second signal D2 may be based on a light incident through the second lens 1112 having the second field of view FOV2 being relatively wide. The image signal processor 1150 may generate the second image data IDAT2 based on the second signal D2. For example, a range of brightness values of the second image data IDAT2 may be different from a range of brightness values of the first image data IDAT1.

In operation S130, whether the resolution of the first image data IDAT1 is equal to the resolution of a portion, which corresponds to the first image data IDAT1, of the second image data IDAT2 is determined. That the resolution of the first image data IDAT1 is equal to the resolution of the portion corresponding to the first image data IDAT1 (S130—Yes) means that additional processing for adjusting the resolution is unnecessary to be performed. Accordingly, the procedure proceeds to operation S140.

In operation S140, cropping is performed on the portion, which corresponds to the first image data IDAT1, of the second image data IDAT2.

In operation S150, HDR processing is performed on the first image data IDAT1 and the cropped portion of the second image data IDAT2. Because a dynamic range of the first image data IDAT1 and a dynamic range of the second image data IDAT2 are different from each other, a wider dynamic range may be obtained through the HDR processing.

Meanwhile, returning to operation S130, when the resolution of the first image data IDAT1 is not equal to the resolution of the portion (S130—No), which corresponds to the first image data IDAT1, of the second image data IDAT2, prior to the HDR processing, additional processing for adjusting the resolution is necessary. Accordingly, the procedure proceeds to operation S160.

In operation S160, the main processor 1800 adjusts the resolution of the first image data IDAT1. For example, when the resolution of the first image data IDAT1 is greater than the resolution of the portion, which corresponds to the first image data IDAT1, of the second image data IDAT2, the main processor 1800 may perform binning on the first image data IDAT1. In contrast, when the resolution of the first image data IDAT1 is smaller than the resolution of the portion, which corresponds to the first image data IDAT1, of the second image data IDAT2, the main processor 1800 may perform upscaling on the first image data IDAT1. As the resolution is adjusted by the main processor 1800, the resolution of the first image data IDAT1 may be equal to the resolution of the portion, which corresponds to the first image data IDAT1, of the second image data IDAT2.

In operation S170, cropping is performed on the portion, which corresponds to the re-sized first image data IDAT1, of the second image data IDAT2.

In operation S180, HDR processing is performed on the re-sized first image data IDAT1 and the cropped portion of the second image data IDAT2. Because a dynamic range of the first image data IDAT1 and a dynamic range of the second image data IDAT2 are different from each other, a wider dynamic range may be obtained through the HDR processing.

However, the inventive concept is not limited to the above embodiments. When the resolution of the first image data IDAT1 is different from the resolution of the portion, which corresponds to the first image data IDAT1, of the second image data IDAT2, the embodiments described with reference to FIGS. 7, 8, and 9 may be applied to the embodiment of FIG. 13.

Figure 13:
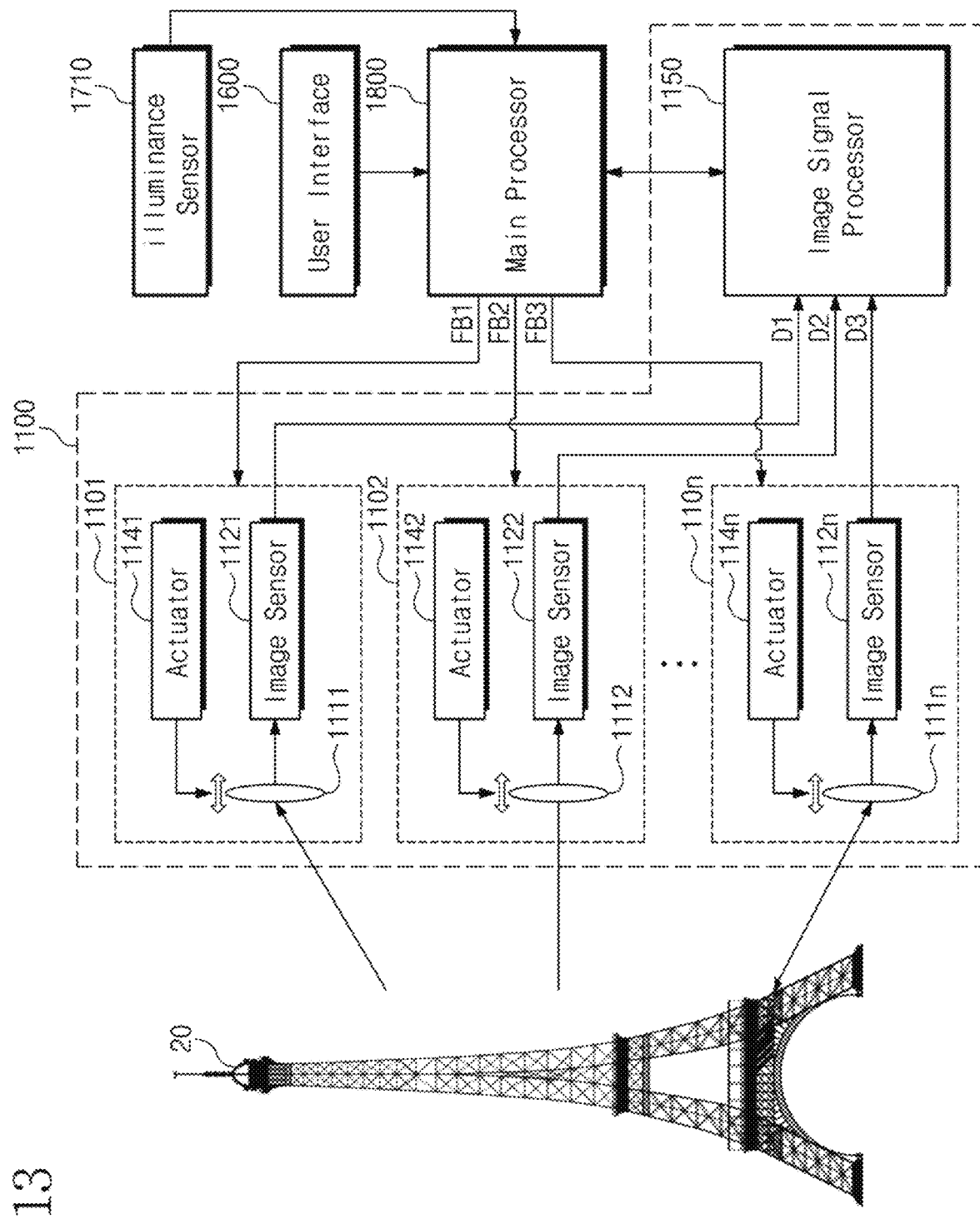
FIG. 13 is a block diagram illustrating an exemplary configuration of an image processing block of FIG. 1.

FIG. 13 is a block diagram illustrating an exemplary configuration of an image processing block of FIG. 1.

The image processing block 1100 may include image sensor blocks 1101, 1102, to 110n and the image signal processor 1150. To conceptually describe the image processing block 1100, the user interface 1600, the illuminance sensor 1710, and the main processor 1800 are illustrated together. For example, the illuminance sensor 1710 may be implemented with a part of the sensor 1700 of FIG. 1.

The first image sensor block 1101 may include the lens 1111, the first actuator 1141, and the first image sensor 1121. The second image sensor block 1102 may include the second lens 1112, the second actuator 1142, and the second image sensor 1122. The n-th image sensor block 110n may include an n-th lens 111n, an n-th actuator 114n, and an n-th image sensor 112n (n being an integer of 3 or more). Configurations and operations of the image sensor blocks 1101 to 110n of FIG. 13 are similar to the configuration and operation of each of the image sensor blocks 1101 and 1102 of FIG. 2, and thus, additional description will be omitted to avoid redundancy.

Figure 14:
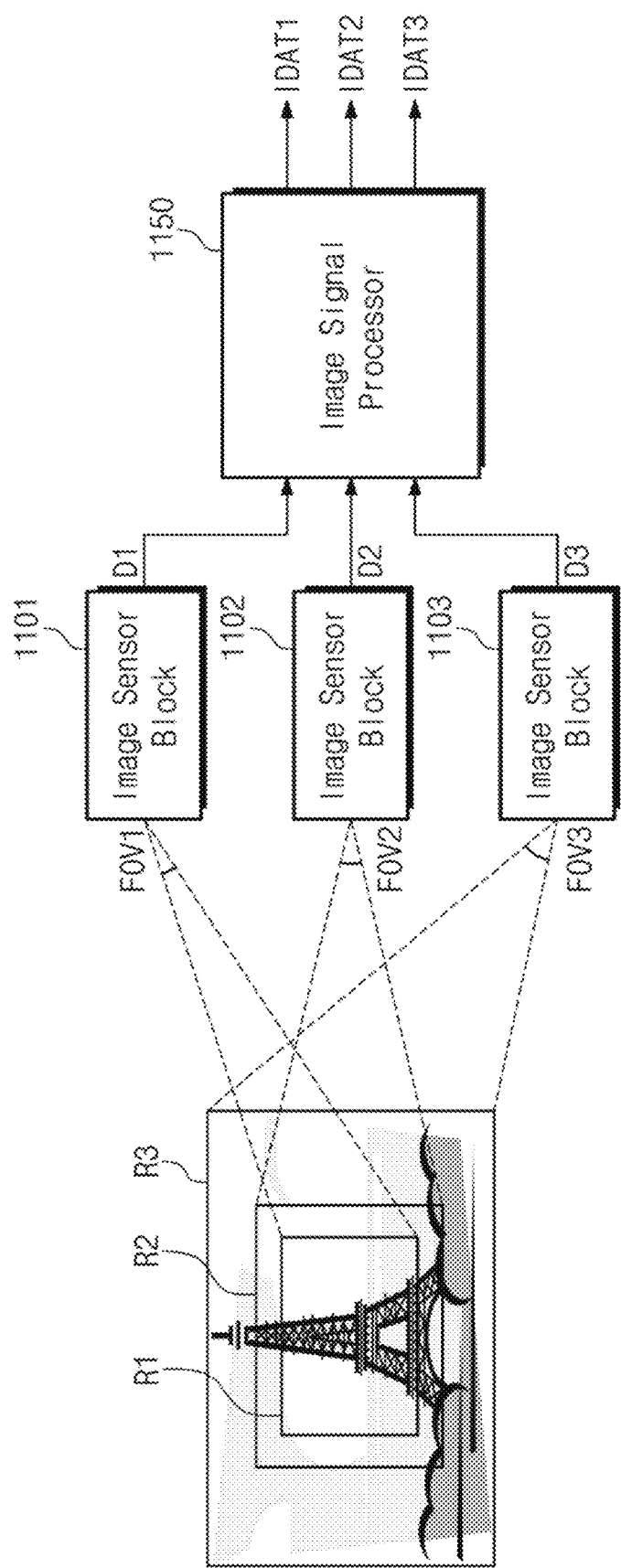
FIG. 14 is a block diagram illustrating exemplary operations of image sensor blocks of FIG. 13.

FIG. 14 is a block diagram illustrating exemplary operations of image sensor blocks of FIG. 13.

In an embodiment, the image processing block 1100 may include first to third image sensor blocks 1101, 1102, and 1103. The first image sensor block 1101 may include the first image sensor 1121 for generating an image of the region R1 corresponding to the first field of view FOV1, the second image sensor 1122 for generating an image of the region R2 corresponding to the second field of view FOV2, and a third image sensor 1123 for generating an image of a region R3 corresponding to a third field of view FOV3.

The third field of view FOV3 may be greater than the second field of view FOV2, and the second field of view FOV2 may be greater than the first field of view FOV1. For example, the first lens 1111 may be a telephoto lens, the second lens 1112 may be a wide lens, and a third lens 1113 may be an ultra-wide lens. For example, the field of view of the first lens 1111 may be 10 degrees to 15 degrees, the field of view of the second lens 1112 may be 70 degrees to 90 degrees, and the field of view of the third lens 1113 may be 100 degrees to 130 degrees. However, the fields of view of the lenses 1111, 1112, and 1113 are not limited thereto.

For example, the first image sensor block 1101 may include a pixel array of a relatively low resolution, the third image sensor block 1103 may include a pixel array of a relatively high resolution, and the second image sensor block 1102 may include a pixel array of a resolution between the relatively low resolution and the relatively high resolution. For example, the first image sensor block 1101 may operate to sense an image of the region R1 of a relatively narrow field of view, the third image sensor block 1103 may operate to sense an image of the region R3 of a relatively wide field of view, and the second image sensor block 1102 may operate to sense an image of the region R2 of an intermediate field of view.

For example, like the above embodiments, resolutions of pixel arrays of at least two of the image sensor blocks 1101, 1102, and 1103 may be equal, or resolutions of pixel arrays of the image sensor blocks 1101, 1102, and 1103 may be different from each other. However, for convenience, the description is given under the assumption that the resolutions of the pixel arrays of the image sensor blocks 1101, 1102, and 1103 are different from each other. In addition, as the assumption of the HDR processing for obtaining a wider dynamic range, there may be a corresponding assumption that brightness values (or ranges of brightness values) of image data respectively output from image sensor blocks are different from each other.

The image signal processor 1150 may obtain the first image data IDAT1 based on the first signal D1 received from the first image sensor block 1101, may obtain the second image data IDAT2 based on the second signal D2 received from the second image sensor block 1102, and may obtain the third image data IDAT3 based on the third signal D3 received from the third image sensor block 1103. The image sensor blocks 1101, 1102, and 1103 may respectively obtain the image data IDAT1, IDAT2, and IDAT3.

Meanwhile, the embodiment of FIG. 14 is similar to the embodiment of FIG. 3 except that an image processing block includes three image sensor blocks. Thus, additional description will be omitted to avoid redundancy.

Figure 15:
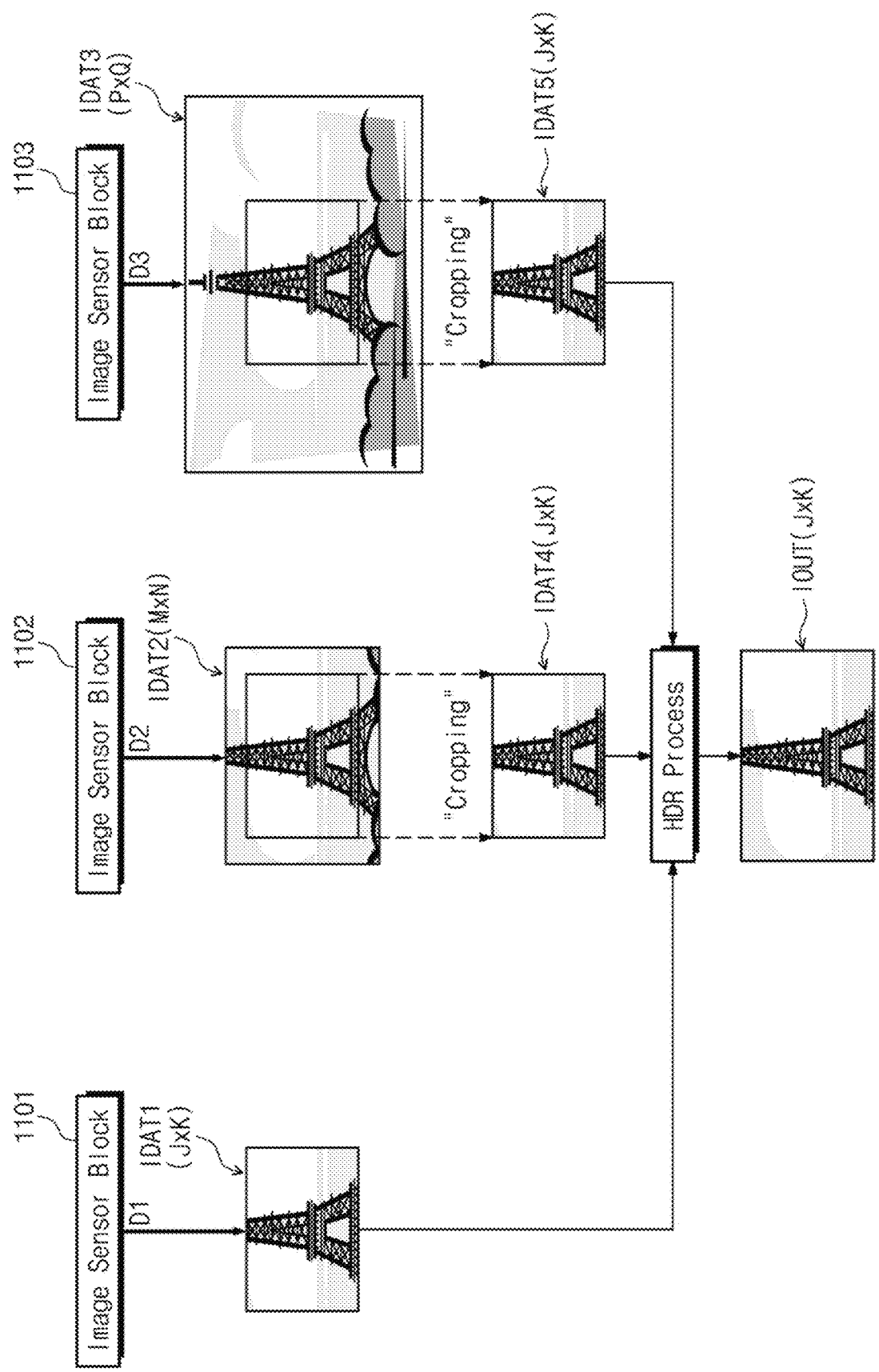
FIG. 15 is a diagram illustrating an operation for HDR processing according to an embodiment.

FIG. 15 is a diagram illustrating an operation for HDR processing according to an embodiment.

How the HDR processing is performed on three images having different fields of view will be described with reference to FIGS. 13, 14, and 15. The image signal processor 1150 may generate the first image data IDAT1 of "J×K," the second image data IDAT2 of "M×N," and the third image data IDAT3 of "P×Q" based on the signals D1, D2, and D3 output from the image sensor blocks 1101, 1102, and 1103.

The main processor 1800 may generate the fourth image data IDAT4 of "J×K" by performing cropping on a region, which corresponds to the first image data IDAT1, of the second image data IDAT2. The main processor 1800 may generate the fifth image data IDAT5 of "J×K" by performing cropping on a region, which corresponds to the first image data IDAT1, of the third image data IDAT3.

Because a brightness value of the first image data IDAT1, a brightness value of the second image data IDAT2, and a brightness value of the third image data IDAT3 are different from each other, a brightness value of the first image data IDAT1, a brightness value of the fourth image data IDAT4, and a brightness value of the fifth image data IDAT5 may be different from each other. The main processor 1800 may perform HDR processing based on the first image data IDAT1, the fourth image data IDAT4, and the fifth image data IDAT5 having different brightness values. The main processor 1800 may obtain the image data IOUT through the HDR processing.

Meanwhile, in the embodiment of FIG. 15, the first image data IDAT1, the cropped fourth image data IDAT4, and the cropped fifth image data IDAT5 have the same resolution of "J×K." However, in the configuration that the resolutions of the first image data IDAT1, the fourth image data IDAT4, and the fifth image data IDAT5 are different from each other, additional processing may be further required prior to HDR processing. This additional processing will be described with reference to FIG. 16.

Figure 16:
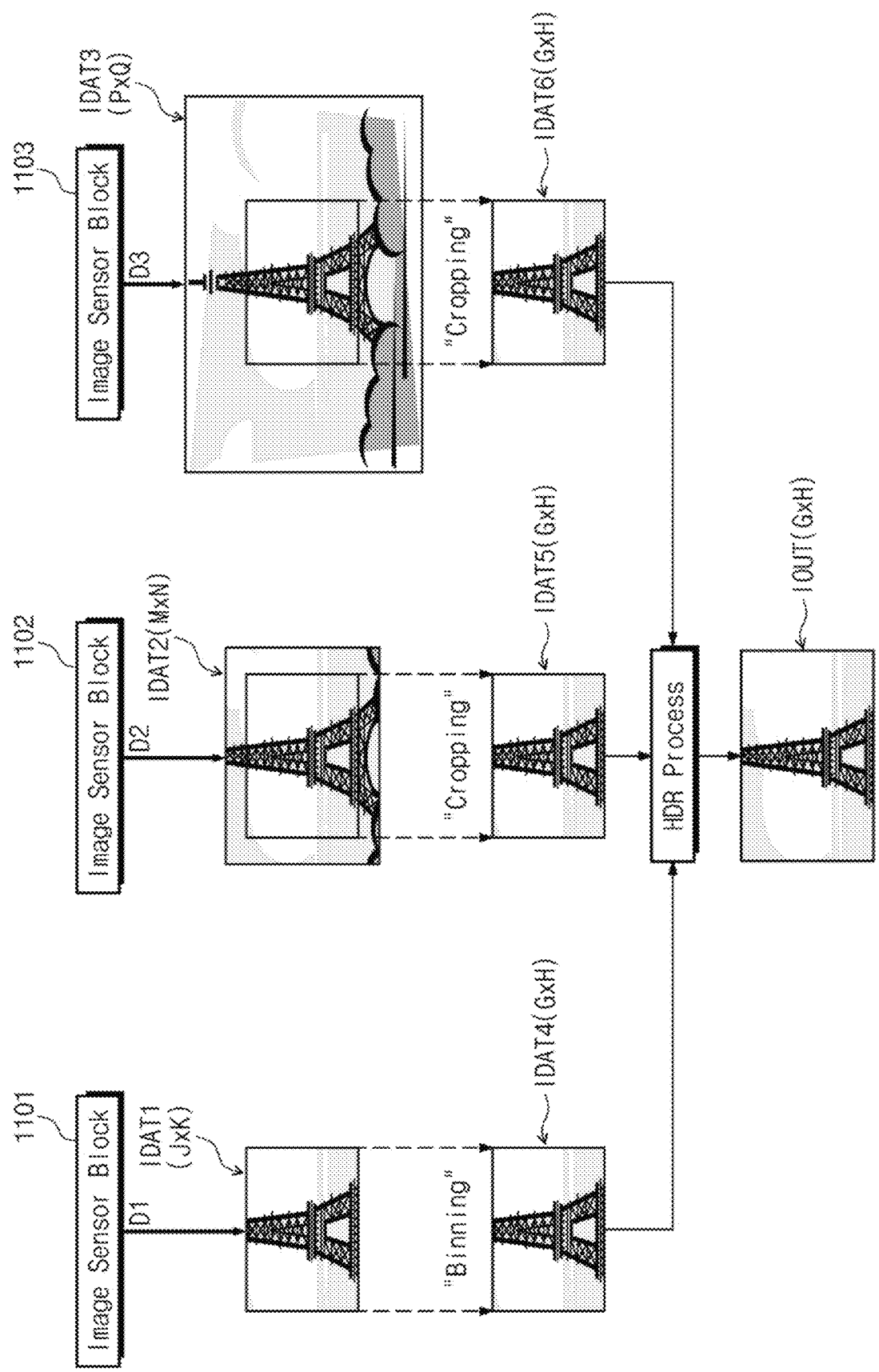
FIG. 16 is a diagram illustrating an operation for HDR processing according to an embodiment.

FIG. 16 is a diagram illustrating an operation for HDR processing according to an embodiment.

For example, when the resolution of the first image data IDAT1 is greater than the resolution of the fifth image data IDAT5 and/or the resolution of the sixth image data IDAT6, the main processor 1800 may perform additional processing on the first image data IDAT1. For example, the main processor 1800 may obtain the fourth image data IDAT4 of "G×H" by performing binning on the first image data IDAT1 of "J×K." Accordingly, the resolution of the fourth image data IDAT4, the resolution of the fifth image data IDAT5, and the resolution of the sixth image data IDAT6 may be equal.

Meanwhile, as well as the case described with reference to FIG. 16, there may be various instances in which the resolution of the first image data IDAT1, the resolution of the fourth image data IDAT4, and the resolution of the fifth image data IDAT5 are different from each other, and various processing schemes for equally adjusting resolutions may be applied to the respective cases. However, in various cases where resolutions of image data are different from each other, various processing schemes for equally adjusting the resolutions may be sufficiently implemented by the embodiments of FIGS. 7 to 9 or by a combination thereof. Thus, additional description will be omitted to avoid redundancy.

Figure 17:
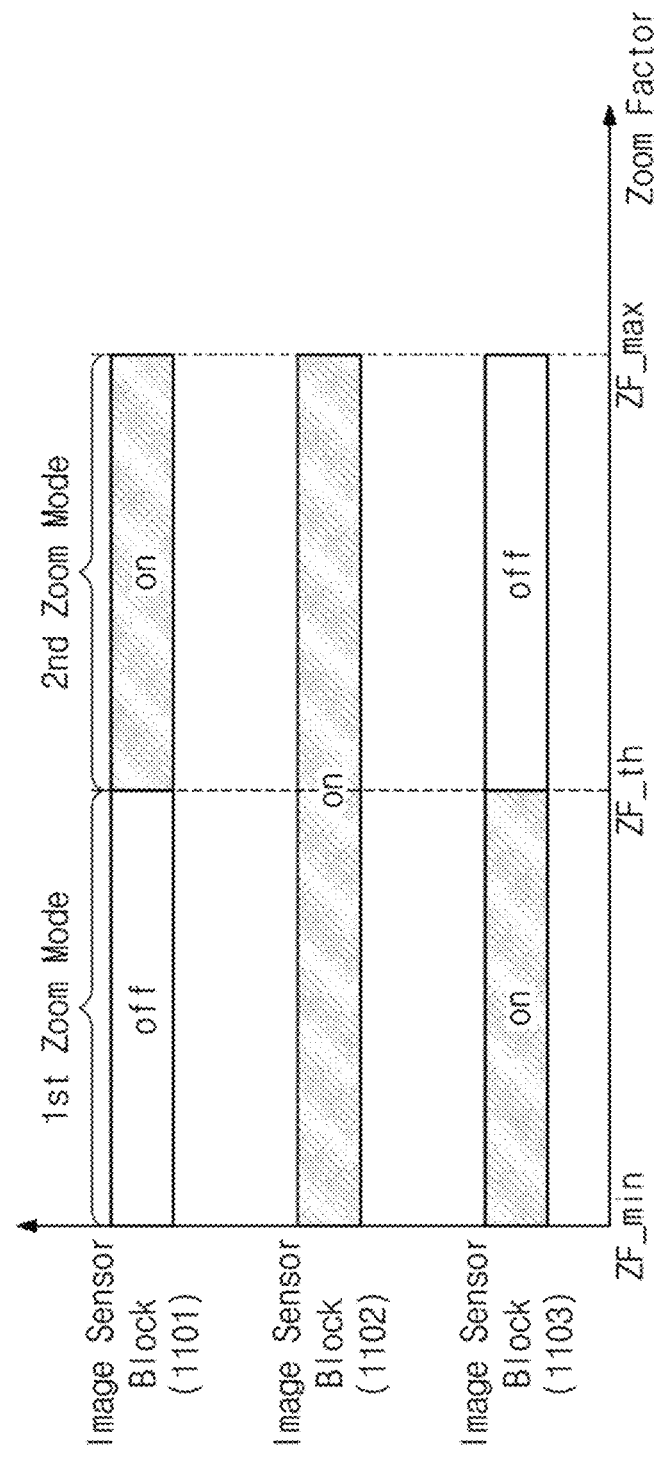
FIG. 17 is a diagram illustrating operations of image sensor blocks according to a zoom factor.
Figure 18:
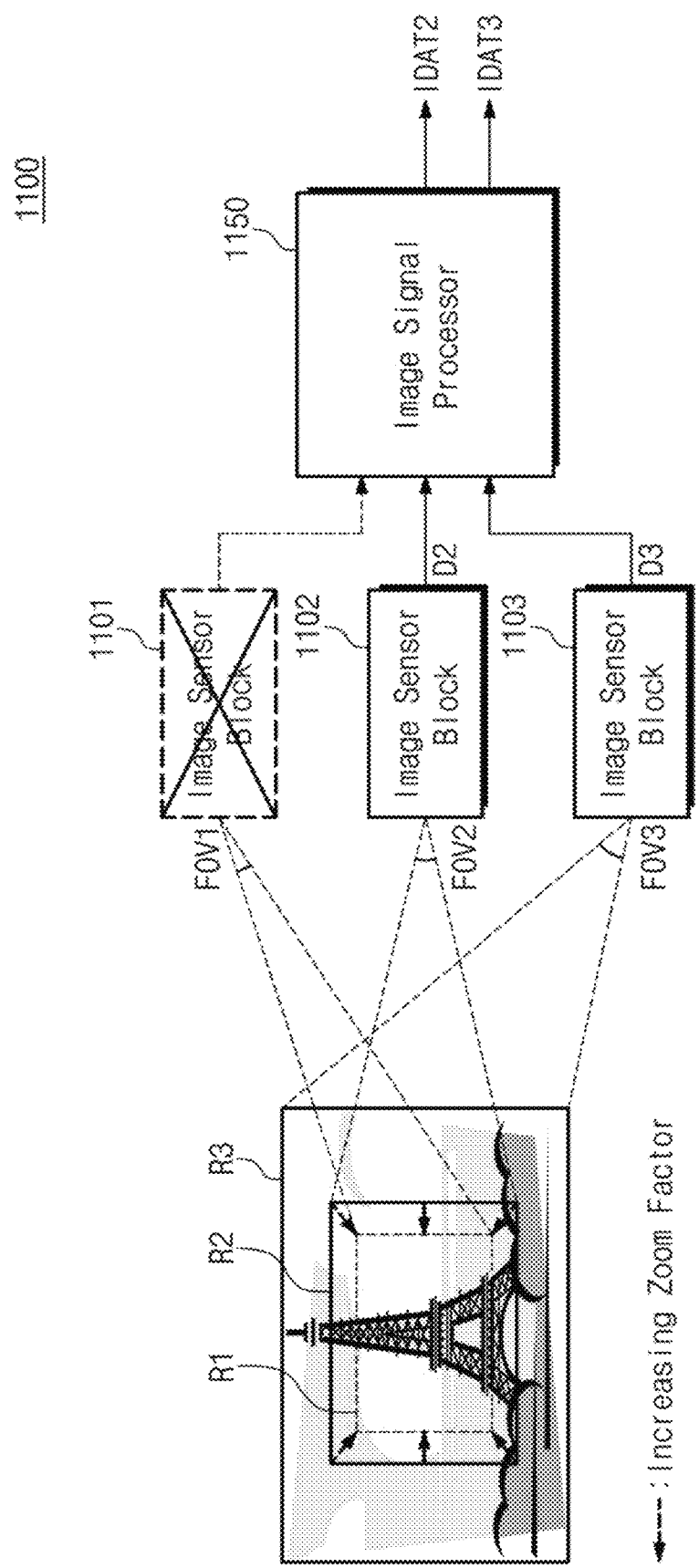
FIG. 18 is a diagram illustrating an operation of image sensor blocks in a first zoom mode.
Figure 19:
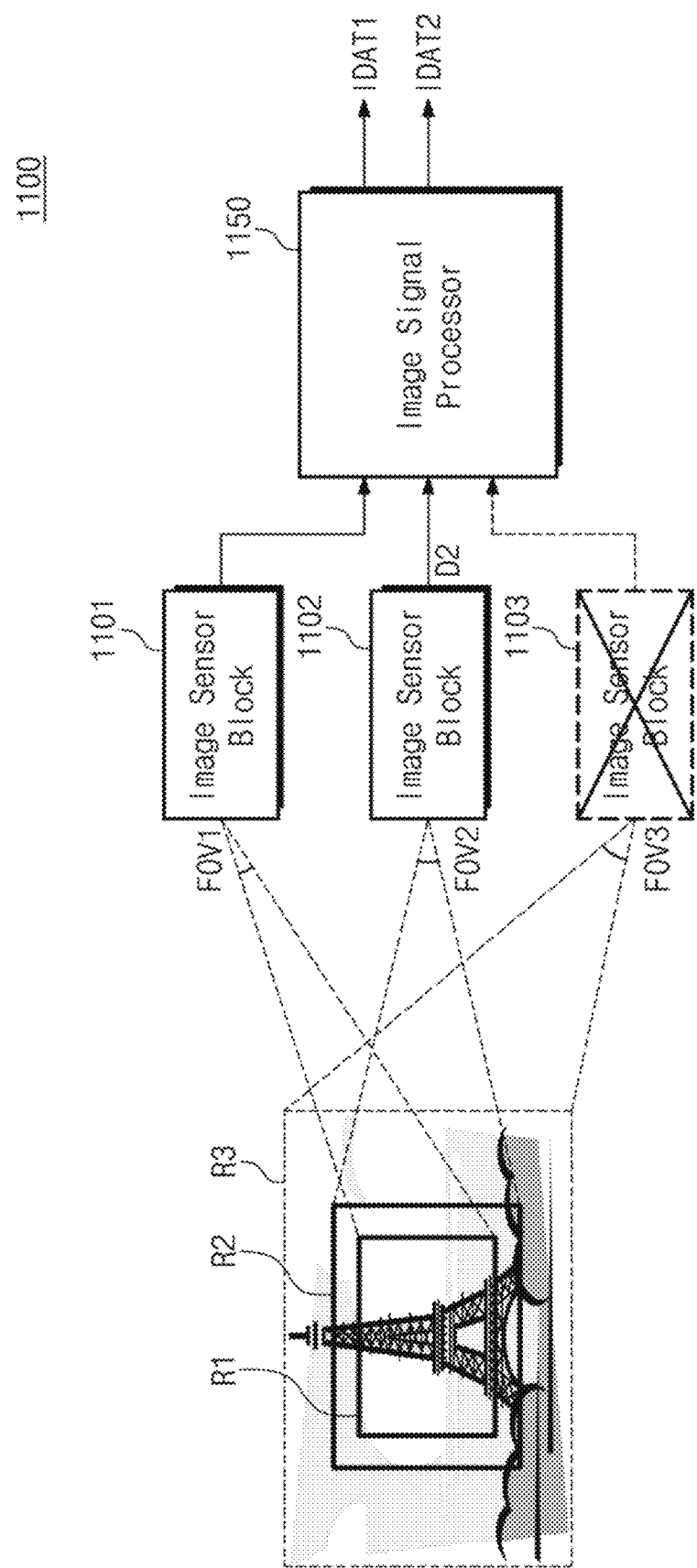
FIG. 19 is a diagram illustrating an operation of image sensor blocks in a second zoom mode.

FIG. 17 is a diagram illustrating an operation of image sensor blocks according to a zoom factor. FIG. 18 is a diagram illustrating an operation of image sensor blocks in a first zoom mode. FIG. 19 is a diagram illustrating an operation of image sensor blocks in a second zoom mode.

The embodiment of FIG. 17 is associated with the configuration in which the quantity of image sensor blocks of FIG. 13 is "3" (i.e., n=3). The zoom factor may be associated with the zoom-in or zoom-out (or magnification or reduction) of an object. For example, the user may set a zoom condition for photographing an intended image by slowly or incrementally increasing/decreasing a value of the zoom factor or selecting a particular value. In the example of FIG. 15, the zoom factor indicated by an x-axis may mean a zoom magnitude intended by the user. For example, the zoom factor may change between a minimum value ZF_min and a maximum value ZF_max. The minimum value ZF_min may be "1," but the inventive concept is not limited thereto. For example, the minimum value ZF_min may be a real number that is more than "0" and is less than "1." The maximum value ZF_max may be a real number that is more than "1." The range of the zoom factor may include a threshold value ZF_th causing a change of the zoom mode.

The user may input a command for changing a zoom magnitude through the user interface 1600 (refer to FIG. 13) for photographing an object placed at distances of various ranges. The main processor 1800 (refer to FIG. 13) may control operations of the image sensor blocks 1101 to 1103 (refer to FIG. 13) in response to a command of the user.

An operation of the image processing block 1100 in the first zoom mode is described with reference to FIGS. 17 and 18. In the configuration that the zoom factor capable of being adjusted by the user is between the minimum value ZF_min and the threshold value ZF_th, the image processing block 1100 operates in the first zoom mode. In the first zoom mode, the first image sensor block 1101 may not operate, and the second image sensor block 1102 and the third image sensor block 1103 may operate. For example, the second image sensor block 1102 may photograph an object corresponding to the region R2 and may output the second signal D2. The third image sensor block 1103 may photograph an object of the region R3 and may output the third signal D3.

The image signal processor 1150 may generate the second image data IDAT2 based on the second signal D2 and may generate the third image data IDAT3 based on the third signal D3. For example, an image corresponding to the third image data IDAT3 may include an image corresponding to the second image data IDAT2. For example, the third image data IDAT3 of a relatively high resolution may be associated with a pixel array of a relatively high resolution, and the second image data IDAT2 of a relatively intermediate resolution may be associated with a pixel array of a relatively intermediate resolution. For example, a brightness value of the third image data IDAT3 may be greater than a brightness value of the second image data IDAT2.

The main processor 1800 may perform HDR processing on the second image data IDAT2 and the third image data IDAT3. The HDR processing may include at least one of the embodiments described with reference to FIGS. 6 to 11.

Meanwhile, while the user of the electronic device 1000 (refer to FIG. 13) captures a video with respect to an object, the user may increase a zoom magnitude for enlarging the object. The zoom factor may increase by increasing the zoom magnitude. The increase of the zoom factor is conceptually illustrated as an arrow in FIG. 18. When the zoom factor reaches a particular threshold value, the zoom mode of the image processing block 1100 may be changed from the first zoom mode to the second zoom mode.

An operation of the image processing block 1100 in the second zoom mode is described with reference to FIGS. 17 and 19. In the configuration that the zoom factor capable of being adjusted by the user is between the threshold value ZF_th and the maximum value ZF_max, the image processing block 1100 operates in the second zoom mode. In the second zoom mode, the third image sensor block 1103 may not operate, and the first image sensor block 1101 and the second image sensor block 1102 may operate. For example, the first image sensor block 1101 may photograph the object of the region R1 and may output the first signal D1. The second image sensor block 1102 may photograph the object of the region R2 and may output the second signal D2.

The image signal processor 1150 may generate the first image data IDAT1 based on the first signal D1 and may generate the second image data IDAT2 based on the second signal D2. For example, an image corresponding to the second image data IDAT2 may include an image corresponding to the first image data IDAT1. For example, the second image data IDAT2 of a relatively intermediate resolution are associated with a pixel array of a relatively intermediate resolution, and the first image data IDAT1 of a relatively low resolution are associated with a pixel array of a relatively low resolution. For example, a brightness value of the second image data IDAT2 may be greater than a brightness value of the first image data IDAT1.

The main processor 1800 may perform HDR processing on the first image data IDAT1 and the second image data IDAT2. The HDR processing may include at least one of the embodiments described with reference to FIGS. 6 to 11.

Figure 20:
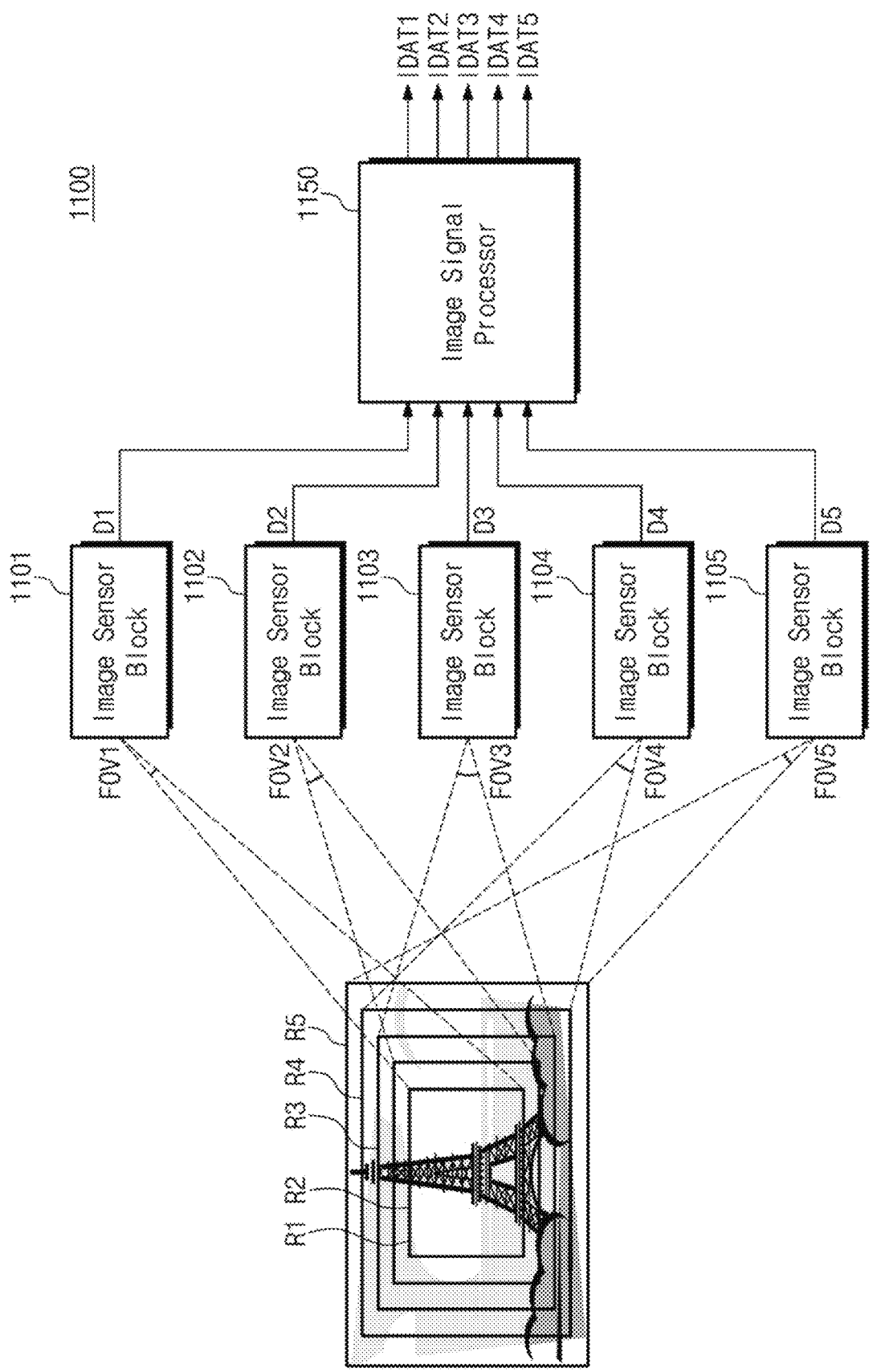
FIG. 20 is a block diagram illustrating exemplary operations of image sensor blocks of FIG. 13.

FIG. 20 is a block diagram illustrating exemplary operations of image sensor blocks of FIG. 13.

The image processing block 1100 may include first to fifth image sensor blocks 1101, 1102, 1103, 1104, and 1105. The first image sensor block 1101 to the fifth image sensor block 1105 may include a first lens of the first field of view FOV1 to a fifth lens of the fifth field of view FOV5. The field of view of the first lens may be the smallest, and the field of view of the fifth lens may be the largest, and thus a field of view may increase (i.e., FOV1<FOV2<FOV3<FOV4<FOV5) across the lenses. For example, the first lens may be a telephoto lens. The second lens and the third lens may be wide lenses having different fields of view. The fourth lens and the fifth lens may be ultra-wide lenses having different fields of view.

The first image sensor block 1101 may generate a first signal D1 associated with an image of a region R1 corresponding to the first field of view FOV1, may generate a second signal D2 associated with an image of a region R2 corresponding to the second field of view FOV2, may generate a third signal D3 associated with an image of a region R3 corresponding to the third field of view FOV3, may generate a fourth signal D4 associated with an image of a region R4 corresponding to the fourth field of view FOV4, and may generate a fifth signal D5 associated with an image of a region R5 corresponding to the fifth field of view FOV5.

Meanwhile, the embodiment of FIG. 20 is similar to the embodiment of FIG. 5 except that an image processing block includes five image sensor blocks. Thus, additional description will be omitted to avoid redundancy.

Figure 21:
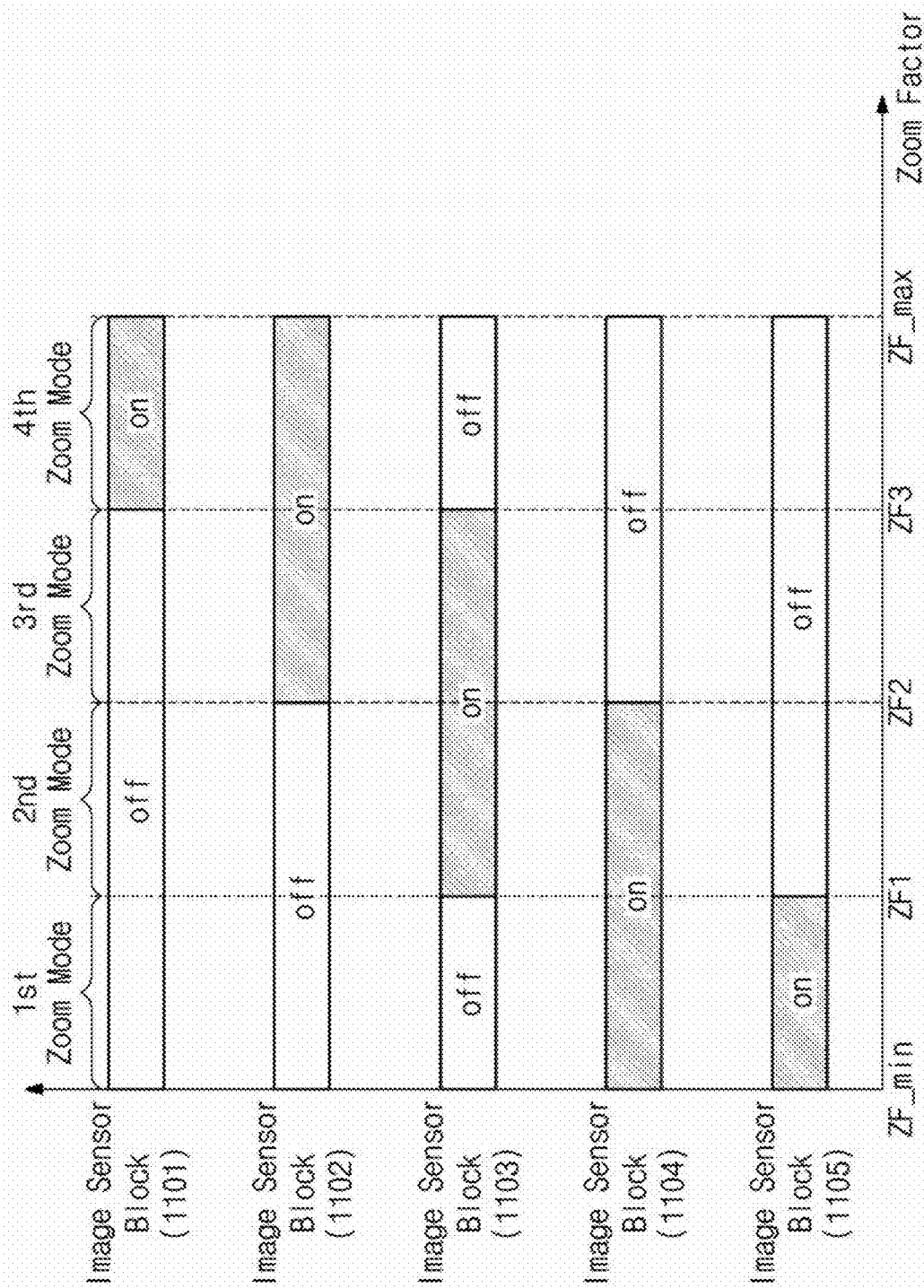
FIG. 21 is a diagram illustrating operations of image sensor blocks according to a zoom factor.

FIG. 21 is a diagram illustrating operations of image sensor blocks according to a zoom factor. An image processing block that operates in a plurality of zoom modes is described with reference to FIGS. 20 and 21.

In the configuration that the zoom factor capable of being adjusted by the user is between the minimum value ZF_min and a first value ZF1, the image processing block 1100 operates in a first zoom mode. In the first zoom mode, the image sensor blocks 1104 and 1105 operate, and the remaining image sensor blocks 1101, 1102, and 1103 do not operate. The image signal processor 1150 generates image data based on signals output from the image sensor blocks 1104 and 1105. The main processor 1800 may perform the HDR processing described with reference to FIGS. 6 to 11 based on image data output from the image signal processor 1150.

In the configuration that the zoom factor has a value between the first value ZF1 and a second value ZF2 as the user increases the zoom magnification, the image processing block 1100 operates in a second zoom mode. In the second zoom mode, the image sensor blocks 1103 and 1104 operate, and the remaining image sensor blocks 1101, 1102, and 1105 do not operate. The image signal processor 1150 generates image data based on signals output from the image sensor blocks 1103 and 1104. The main processor 1800 may perform the HDR processing described with reference to FIGS. 6 to 11 based on image data output from the image signal processor 1150.

Meanwhile, in the configuration that the zoom factor has a value between the second value ZF2 and a third value ZF3 as the user continues to increase the zoom magnification, the image processing block 1100 operates in a third zoom mode. In the third zoom mode, the image sensor blocks 1102 and 1103 operate, and the remaining image sensor blocks 1101, 1104, and 1105 do not operate. In the third zoom mode, the main processor 1800 performs HDR processing based on corresponding image data. As the zoom factor continues to increase, the image processing block 1100 may operate in the third zoom mode or a fourth zoom mode. In the above cases, the main processor 1800 performs HDR processing based on corresponding image data.

Figure 22:
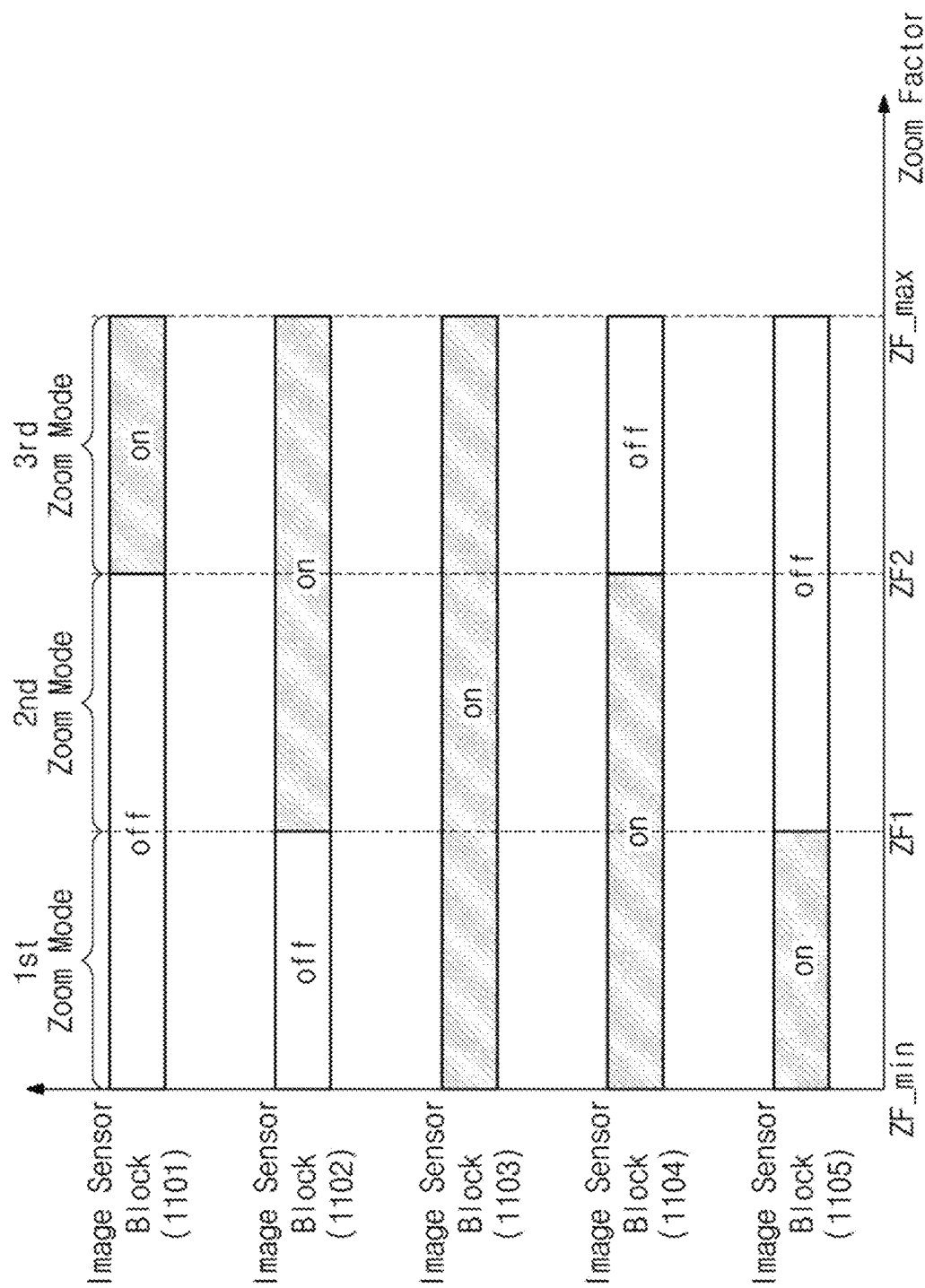
FIG. 22 is a diagram illustrating operations of image sensor blocks according to a zoom factor.

FIG. 22 is a diagram illustrating operations of image sensor blocks according to a zoom factor. An image processing block that operates in a plurality of zoom modes is described with reference to FIGS. 20 and 22.

In the configuration that the zoom factor capable of being adjusted by the user is between the minimum value ZF_min and the first value ZF1, the image processing block 1100 operates in a first zoom mode. In the first zoom mode, the image sensor blocks 1103, 1104, and 1105 operate, and the remaining image sensor blocks 1101 and 1102 do not operate. The image signal processor 1150 generates image data based on signals output from the image sensor blocks 1103, 1104, and 1105. The main processor 1800 may perform at least one of a plurality of HDR processing described with reference to FIGS. 15 and 16 based on image data output from the image signal processor 1150.

In the configuration that the zoom factor has a value between the first value ZF1 and the second value ZF2 as the user increases the zoom magnification, the image processing block 1100 operates in a second zoom mode. In the second zoom mode, the image sensor blocks 1102, 1103, and 1104 operate, and the remaining image sensor blocks 1101 and 1105 do not operate. The image signal processor 1150 generates image data based on signals output from the image sensor blocks 1102, 1103, and 1104. The main processor 1800 may perform HDR processing based on image data output from the image signal processor 1150.

In the configuration that the zoom factor has a value between the second value ZF2 and the third value ZF3 as the user continues to increase the zoom magnification, the image processing block 1100 operates in a third zoom mode. In the third zoom mode, the image sensor blocks 1101, 1102, and 1103 operate, and the remaining image sensor blocks 1104 and 1105 do not operate. In the third zoom mode, the main processor 1800 performs HDR processing based on corresponding image data.

Meanwhile, the embodiments of FIGS. 20 to 22 are described under the assumption that the number of image sensor blocks is 5, but the inventive concept is not limited thereto. That is, additional image sensor blocks may be adopted, and the technologies described with reference to FIGS. 20 to 22 may be identically applied to configurations in which six or more image sensor blocks are adopted.

Figure 23:
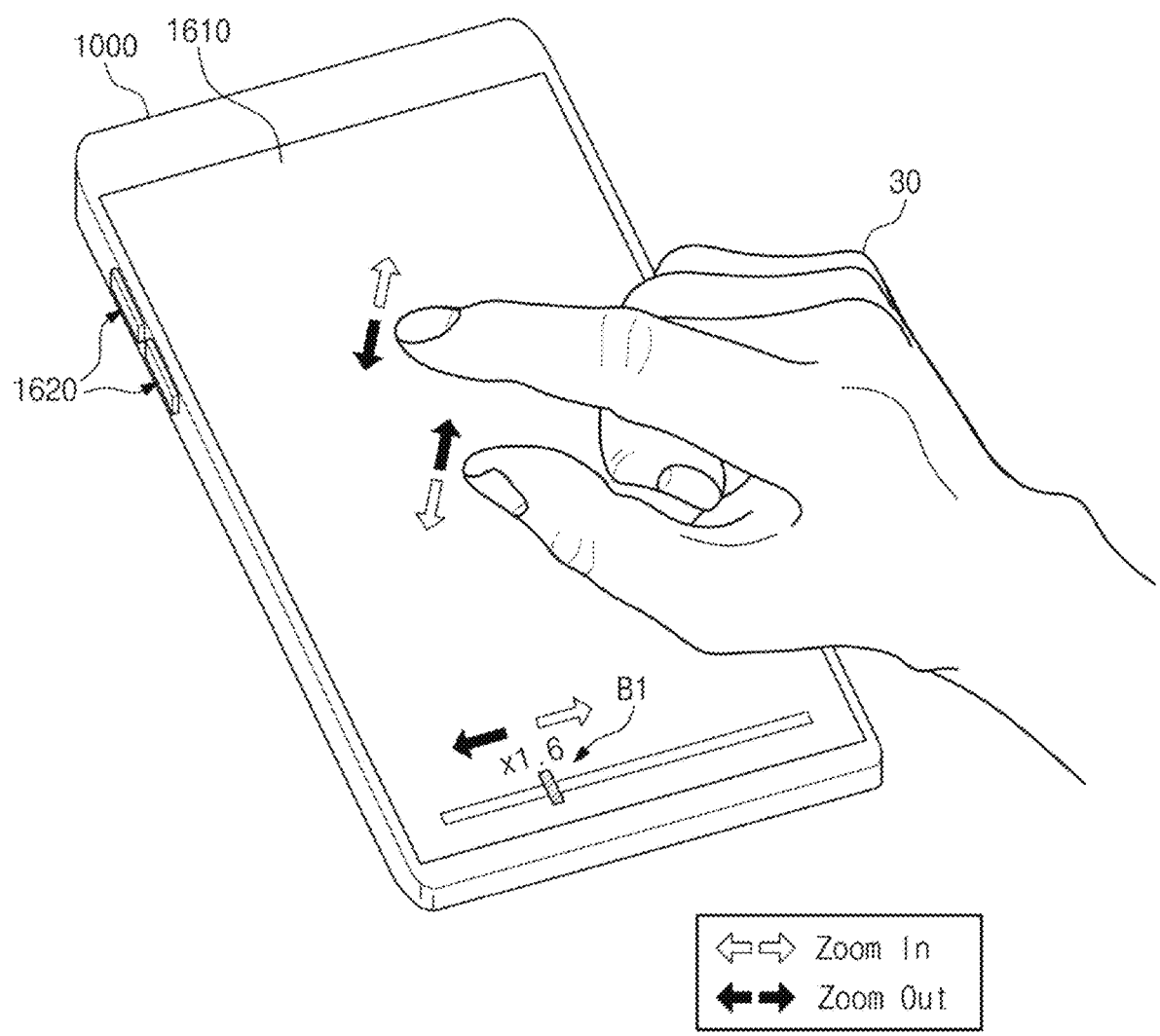
FIG. 23 is a conceptual diagram illustrating an exemplary method in which a magnification is adjusted depending on a command received through a user interface of FIG. 13.

FIG. 23 is a conceptual diagram illustrating an exemplary method in which a magnification is adjusted depending on a command received through a user interface of FIG. 13.

In some cases, a user 30 may intend to input a zoom magnification to the user interface 1600 while slowly increasing or decreasing a value of the zoom magnification. For example, the user 30 may touch their two fingers on a touchscreen 1610 of the user interface 1600. Next, the user 30 may take action of widening or narrowing a distance between the two fingers for slowly adjusting a value of the zoom magnification (e.g., pinch zoom-in or pinch zoom-out).

For another example, the user 30 may use a graphic interface B1 displayed on a display device of the user interface 1600 for adjusting a value of the zoom magnification. The user 30 may slowly adjust a value of the zoom magnification by sliding their finger along a slide bar of the graphic interface B1. In another example, the user 30 may press buttons 1620 of the user interface 1600 for slowly increasing or decreasing a value of the zoom magnification.

However, an operation of adjusting a zoom magnification through a touch is exemplary and is not intended to limit the inventive concept. For example, there may be adopted input of a command to adjust a zoom magnification through a voice, a gesture of a user, a gesture using a pen, etc.

According to an embodiment, HDR (High Dynamic Range) processing may be efficiently performed by obtaining image data to be used for the HDR processing through a plurality of image sensors.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. An electronic device for processing a plurality of video frames, comprising:
   a first image sensor block configured to generate a first data signal by photographing an object at a first field of view and to sequentially generate a third data signal by photographing to the object at the first field of view;
   a second image sensor block configured to generate a second data signal by photographing the object at a second field of view greater than the first field of view and to sequentially generate a fourth data signal by photographing the object at the second field of view;
   an image signal processor configured to generate first image data of a first resolution based on the first data signal, to generate second image data of a second resolution based on the second data signal, to generate third image data of a third resolution based on the third data signal, and to generate fourth image data of a fourth resolution based on the fourth data signal; and a main processor configured to:
obtain first cropped image data from among the second image data that correspond to the first image data,
obtain second cropped image data from among the fourth image data that correspond to the first image data or the third image data, and
perform high dynamic range (HDR) processing based on the first image data, the third image data, the first cropped image data, and the second cropped image data, to generate an HDR processed image,
wherein the HDR processed image is a first video frame from among the plurality of video frames.

2. The electronic device of claim 1, wherein, when the first resolution is greater than a resolution of the first cropped image data, the main processor is further configured to perform binning on the first image data to obtain binned image data.

3. The electronic device of claim 2, wherein a resolution of the binned image data is equal to the resolution of the first cropped image data.

4. The electronic device of claim 1, wherein, when the first resolution is smaller than a resolution of the first cropped image data, the main processor is further configured to perform binning on the first cropped image data cropped to obtain binned image data.

5. The electronic device of claim 4, wherein the first resolution is equal to a resolution of the binned image data.

6. The electronic device of claim 1, wherein, when the first resolution is smaller than a resolution of the first cropped image data, the main processor is further configured to perform upscaling on the first image data to obtain upscaled image data.

7. The electronic device of claim 6, wherein a resolution of the upscaled image data is equal to the resolution of the first cropped image data.

8. The electronic device of claim 1, wherein, when the first resolution and the third resolution are greater than a resolution of the first cropped image data and a resolution of the second cropped image data, the main processor is further configured to perform binning on the first image data and the third image data to obtain binned image data.

9. The electronic device of claim 1, wherein the first image sensor block comprises a first pixel array of a first plurality of pixels,
wherein the second image sensor block comprises a second pixel array of a second plurality of pixels, and
wherein a second number of the second plurality of pixels is greater than a first number of the first plurality of pixels.

10. The electronic device of claim 1, wherein a resolution of the first cropped image data is half or less of the second resolution.

11. An electronic device for processing a plurality of video frames, comprising:
a first image sensor block configured to photograph an object at a first field of view and to generate a first data signal corresponding to the object photographed at the first field of view;
a second image sensor block configured to photograph the object at a second field of view greater than the first field of view and to generate a second data signal corresponding to the object photographed at the second field of view;
a third image sensor block configured to photograph the object at a third field of view greater than the second field of view and to generate a third data signal corresponding to the object photographed at the third field of view;
an image signal processor configured to generate first image data of a first resolution based on the first data signal, to generate second image data of a second resolution based on the second data signal, and to generate third image data of a third resolution based on the third data signal; and
a main processor configured to:
perform high dynamic range (HDR) processing based on the first image data, the second image data, and the third image data, and, in a first zoom factor period,
obtain cropped image data from among the third image data that correspond to the second image data, and
perform HDR processing based on the second image data and the cropped image data, to generate an HDR processed image,
wherein the HDR processed image is a first video frame of the plurality of video frames.

12. The electronic device of claim 11, wherein, when the second resolution is greater than a resolution of the cropped image data, the main processor is further configured to perform binning on the second image data to obtain binned image data.

13. The electronic device of claim 11, wherein, in a second zoom factor period greater than the first zoom factor period, the main processor is further configured to obtain second cropped image data from among the second image data that correspond to the first image data, and perform the HDR processing based on the first image data and the second cropped image data.

14. The electronic device of claim 13, wherein, when the first resolution is greater than a resolution of the second cropped image data, the main processor is further configured to perform binning on the first image data to obtain binned image data.

15. A method of processing a plurality of video frames by using a first image sensor block having a first field of view and a second image sensor block having a second field of view greater than the first field of view, the method comprising:
generating, by the first image sensor block, a first data signal by photographing an object at the first field of view, and sequentially generating a third data signal by photographing the object at the first field of view;
generating, by the second image sensor block, a second data signal by photographing the object photographed at the second field of view, and sequentially generating a fourth data signal by photographing the object at the second field of view;
generating first image data of a first resolution based on the first data signal;
generating second image data of a second resolution based on the second data signal;
generating third image data of a third resolution based on the third data signal;
generating fourth image data of a fourth resolution based on the fourth data signal;
generating first cropped image data from among the second image data that correspond to the first image data;

generating second cropped image data from among the fourth image data that correspond to the first image data or the third image data; and performing high dynamic range (HDR) processing based on the first image data, the third image data, the first cropped image data, and the second cropped image data, to generate an HDR processed image, wherein the HDR processed image is a first video frame of the plurality of video frames.

16. The method of claim 15, further comprising:
comparing the first resolution and a resolution of the first cropped image data.

17. The method of claim 16, further comprising:
when the first resolution is greater than the resolution of the first cropped image data:
  performing binning on the first image data to obtain binned image data; and
  performing the HDR processing based on the binned image data and the first cropped image data.

18. The method of claim 16, further comprising:
when the first resolution is smaller than the resolution of the first cropped image data:
  performing binning on the first cropped image data to obtain binned image data; and
  performing the HDR processing based on the first image data and the binned image data.

19. The method of claim 16, further comprising:
when the first resolution is smaller than the resolution of the first cropped image data:
  upscaling the first image data to obtain upscaled image data; and
  performing the HDR processing based on the upscaled image data and the first cropped image data.

* * * * *